United States Patent
Cannon

(10) Patent No.: US 6,765,731 B1
(45) Date of Patent: Jul. 20, 2004

(54) LOW ELEMENT COUNT PROJECTION LENSES FOR USE WITH PIXELIZED PANELS

(75) Inventor: Bruce L. Cannon, Portland, OR (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/402,197

(22) Filed: Mar. 28, 2003

(51) Int. Cl.[7] .............................. G02B 9/04; G02B 9/00; G03B 21/00
(52) U.S. Cl. ...................... 359/793; 359/651; 359/649; 353/122
(58) Field of Search ................................. 359/793, 651, 359/649, 753, 648, 691, 761, 782, 783, 781; 353/122

(56) References Cited

U.S. PATENT DOCUMENTS

| | | | |
|---|---|---|---|
| 4,738,516 A | 4/1988 | Verhoeven et al. | 359/718 |
| 5,299,062 A | 3/1994 | Ogata | 359/571 |
| 5,812,326 A | 9/1998 | Yamada | 359/749 |
| 5,870,228 A | 2/1999 | Kreitzer et al. | 359/649 |
| 6,144,503 A | 11/2000 | Sugano | 359/749 |
| 6,324,014 B1 | 11/2001 | Moskovich | 359/651 |
| 6,471,359 B1 * | 10/2002 | Kim et al. | 353/122 |
| 6,560,041 B2 * | 5/2003 | Ikeda et al. | 359/749 |

OTHER PUBLICATIONS

Smith, Warren J., Modern Optical Engineering: The Design of Optical Systems, (2nd Edition), McGraw–Hill, New York, 1990, pp. 151–154 and 452–453.

Zemax Development Corporation's documentation entitled "GHO—Ghost Image Analysis," San Diego, California, pp. 9–49 through 9–54 and 9–61 through 9–76, published prior to Mar. 28, 2003.

U.S. patent application Ser. No. 10/337,959, filed Jan. 7, 2003, Folded, Telecentric Projection Lenses for Use with Pixelized Panels.

* cited by examiner

Primary Examiner—Georgia Epps
Assistant Examiner—Tim Thompson
(74) Attorney, Agent, or Firm—Bruce E. Black

(57) ABSTRACT

Projection lenses for use with pixelized panels (PP) are provided. The projection lenses have a negative first unit (U1) separated from a positive second unit (U2) by a reflective surface (RS) which folds the lens' optical axis. The lenses are telecentric on the short conjugate side, have a large field of view in the direction of the long conjugate, and have low aberration levels, including, in particular, low levels of lateral color.

20 Claims, 3 Drawing Sheets

LOW ELEMENT COUNT PROJECTION LENSES FOR USE WITH PIXELIZED PANELS

FIELD OF THE INVENTION

This invention relates to projection lenses and, in particular folded, telecentric projection lenses for use in forming an image of an object composed of pixels, such as, a DMD, a reflective LCD, a transmissive LCD, or the like.

DEFINITIONS

As used in this specification and in the claims, the following terms shall have the following meanings:

(1) Telecentric

Telecentric lenses are lenses which have at least one pupil at infinity. In terms of principal rays, having a pupil at infinity means that the principal rays are parallel to the optical axis (a) in object space, if the entrance pupil is at infinity, or (b) in image space, if the exit pupil is at infinity.

In practical applications, a telecentric pupil need not actually be at infinity since a lens having an entrance or exit pupil at a sufficiently large distance from the lens' optical surfaces will in essence operate as a telecentric system. The principal rays for such a lens will be substantially parallel to the optical axis and thus the lens will in general be functionally equivalent to a lens for which the theoretical (Gaussian) location of the pupil is at infinity.

Accordingly, as used herein, the terms "telecentric" and "telecentric lens" are intended to include lenses which have a pupil at a long distance from the lens' elements, and the term "telecentric pupil" is used to describe such a pupil at a long distance from the lens' elements. For the projection lenses of the invention, the telecentric pupil distance will in general be at least about 20 times the lens' focal length.

(2) Effective Back Focal Length

The effective back focal length (BFL) of a projection lens/pixelized panel combination is the distance between the front surface of the pixelized panel and the vertex of the back surface of the rearward-most lens element of the projection lens which has optical power when (1) the image of the pixelized panel is located at infinity and (2) the projection lens is located in air, i.e., the space between the rearward-most lens element of the projection lens and the pixelized panel is filled with air as opposed to the glasses making up the prisms, beam splitters, etc. normally used between a projection lens and a pixelized panel.

BACKGROUND OF THE INVENTION

A. Projection Systems

Projection systems are used to form an image of an object on a viewing screen. Such systems can be of the front projection or rear projection type, depending on whether the viewer and the object are on the same side of the screen (front projection) or on opposite sides of the screen (rear projection).

The basic structure of such a system is shown in FIG. 4, where 10 is a light source (e.g., a metal halide or a high pressure mercury vapor lamp), 12 is illumination optics which forms an image of the light source (the "output" of the illumination system), 14 is the object which is to be projected (i.e., for the lenses of the present invention, a matrix of on and off pixels), and 13 is a projection lens, composed of multiple lens elements, which forms an enlarged image of object 14 on viewing screen 16.

For front projection systems, the viewer will be on the left side of screen 16 in FIG. 4, while for rear projection systems, the viewer will be on the right side of the screen. For rear projection systems which are to be housed in a single cabinet, one or more mirrors are often used between the projection lens and the screen to fold the optical path and thus reduce the system's overall size.

Projection systems in which the object is a pixelized panel (also known in the art as a "digital light valve" or a "microdisplay") are used in a variety of applications. Such systems preferably employ a single projection lens which forms an image of a single panel used to produce (either sequentially or simultaneously) the red, green, and blue components of the final image or, in some cases, an image of three panels, one for red light, a second for green light, and a third for blue light. For certain applications, e.g., large image rear projection systems, multiple panels and multiple projection lenses are used, with each panel/projection lens combination producing a portion of the overall image. Irrespective of the details of the application, the projection lens generally needs to have a long effective back focal length to accommodate the prisms, beam splitters, and other components normally used with pixelized panels.

A particularly important application of projection systems employing pixelized panels is in the area of rear projection systems which can used as large screen projection televisions (PTVs) and/or computer monitors. Improvements in the technology used to manufacture microdisplays has led to a rise in the popularity of projection systems employing such displays. To compete effectively with the established cathode ray tube (CRT) technology, projection systems based on microdisplays need to be smaller in size and lower in weight than CRT systems having the same screen size.

B. Optical Performance

To display images having a high information content (e.g., to display data), a microdisplay must have a large number of pixels. Since the devices themselves are small, the individual pixels are small, a typical pixel size ranging from $17\mu$ for DMD displays to approximately $8\mu$ or even less for reflective LCDs. This means that the projection lenses used in these systems must have a very high level of correction of aberrations. Of particular importance is the correction of chromatic aberrations and distortion.

A high level of chromatic aberration correction is important because color aberrations can be easily seen in the image of a pixelized panel as a smudging of a pixel or, in extreme cases, the complete dropping of a pixel from the image. Lateral color, i.e., the variation of magnification with color, is particularly troublesome since it manifests itself as a decrease in contrast, especially at the edges of the field. In extreme cases, a rainbow effect in the region of the full field can be seen.

In projection systems employing CRTs a small amount of (residual) lateral color can be compensated for electronically by, for example, reducing the size of the image produced on the face of the red CRT relative to that produced on the blue CRT. With a pixelized panel, however, such an accommodation cannot be performed because the image is digitized and thus a smooth adjustment in size across the full field of view is not possible. A higher level of lateral color correction, including correction of secondary lateral color, is thus needed from the projection lens.

The use of a pixelized panel to display data leads to stringent requirements regarding the correction of distortion. This is so because good image quality is required even at the extreme points of the field of view of the lens when viewing data. As will be evident, an undistorted image of a displayed number or letter is just as important at the edge of the field as it is at the center.

Moreover, projection lenses are often used with offset panels. In particular, in the case of DMDs, an offset is typically needed to provide the appropriate illumination geometry and to allow the dark-field light to miss the entrance pupil of the lens. This dark field light corresponds to the off position of the pixels of the DMD.

When a panel is offset the distortion at the viewing screen does not vary symmetrically about a horizontal line through the center of the screen but can increase monotonically from, for example, the bottom to the top of the screen. This effect makes even a small amount of distortion readily visible to the viewer.

Low distortion and a high level of color correction are particularly important when an enlarged image of a WINDOWS type computer interface is projected onto a viewing screen. Such interfaces with their parallel lines, bordered command and dialog boxes, and complex coloration, are in essence test patterns for distortion and color. Users readily perceive and object to even minor levels of distortion or color aberration in the images of such interfaces.

In addition to high levels of color and distortion correction, projection lenses for use with pixelized panels need to have low levels of ghost generation, especially when the pixelized panel is of the reflective type, e.g., a DMD or reflective LCD.

As known in the art, ghosts can be generated by image light reflecting back towards the object from one of the lens surfaces of a projection lens. Depending upon the shape of the lens surface and its location relative to the object, such reflected light can be re-reflected off of the object so that it reenters the projection lens and is projected onto the screen along with the desired image. Such ghost light always reduces contrast at least to some extent. In extreme cases, a second image can actually be seen on the screen.

Because the operation of DMDs and reflective LCDs depend upon their ability to reflect light efficiently, projection systems employing panels of these types are particularly susceptible to ghost problems. Ghosts can also be generated by light reflecting backwards off of one lens surface and then being re-reflected in a forward direction by a second lens surface. When reflective pixelized panels are used, ghosts generated by reflections from two lens surfaces are generally less troublesome than ghosts generated by a lens surface/pixelized panel combination.

C. Telecentricity

The above-mentioned pixelized panels and, in particular, DMDs, typically require that the light beam from the illumination system has a near-normal angle of incidence upon the display.

In terms of the projection lens, this translates into a requirement that the lens has a telecentric entrance pupil, i.e., the projection lens must be telecentric in the direction of its short imaging conjugate where the object (pixelized panel) is located. This makes the lens asymmetric about the aperture stop which makes the correction of lateral color more difficult.

D. Cabinet Size

For rear projection systems, there is an ever increasing demand for smaller cabinet sizes (smaller footprints).

In terms of the projection lens, this translates into a requirement that the lens has a wide field of view in the direction of the image (screen). Increases in the field of view from, for example, 82° to, for example, 88°, can be of substantial significance to manufacturers of projection televisions. This is so because such an increase in the field of view of the projection lens can allow the TV manufacturer to reduce the dimensions of its cabinet by an inch or more. A smaller cabinet, in turn, makes a projection television more desirable in the highly competitive consumer market for PTVs.

The requirement for a large field of view makes it even more difficult to correct the lateral color of the lens. This is especially so when combined with the requirement for a long effective back focal length which itself makes it more difficult to correct lateral color. Also, as mentioned above, the requirement for telecentricity is a third factor which makes the correction of lateral color challenging.

In addition to increasing the field of view, cabinet sizes can also be i reduced through the use of a folded projection lens, i.e., a lens having an internal reflective surface (e.g. a mirror or prism) which allows the lens to have an overall form which is easier to integrate with the other components of the projection system and is more compact. In terms of lens design, the use of such a reflective surface means that two of the lens units making up the projection lens must be separated by a distance which is sufficiently long to receive the reflective surface. A construction of this type makes it more difficult to correct the aberrations of the system, especially if the lens is to include only a small number of lens elements as is desired to reduce the cost, weight, and complexity of the projection lens.

Achieving a long back focal length, a wide field of view in the direction of the lens' long conjugate, telecentricity, and a folded configuration, while still maintaining high levels of aberration correction and low levels of ghost generation, is particularly challenging since these various requirements tend to work against one another. To do so while minimizing the number of lens elements used in the lens is even more demanding. As discussed and illustrated below, the present invention provides projection lenses which satisfy these conflicting criteria.

SUMMARY OF THE INVENTION

In view of the foregoing, there exists a need in the art for projection lenses for use with pixelized panels which have some and preferably all of the following properties:

(1) a high level of lateral color correction, including correction of secondary lateral color;
(2) low distortion;
(3) a large field of view in the direction of the image;
(4) a telecentric entrance pupil;
(5) a long effective back focal length;
(6) a folded configuration;

(7) a low level of ghost generation; and (8) a low element count.

To satisfy this need in the art, the invention provides projection lenses which have some and preferably all of the above eight features.

In particular, the invention provides a projection lens for forming an enlarged image of a pixelized panel on a screen, said projection lens having an optical axis, a long conjugate side (image or screen side), a short conjugate side (object or pixelized panel side), and an effective focal length $f_0$, said lens comprising the following in order from the long conjugate side to the short conjugate side:

(A) a first lens unit (U1) having a negative power and comprising a plurality of lens elements, wherein:
  (i) one of the lens elements $L_M$ is a negative lens element of overall meniscus shape which is convex towards the long conjugate side and comprises at least one aspheric surface; and
  (ii) another of the lens elements (e.g., lens element $L_S$) has an optical surface $S_1$ which constitutes the short conjugate end of the first lens unit;

(B) a reflective surface (RS) for folding the projection lens' optical axis (e.g., a mirror or prism which produces a fold in the optical axis in the range of, for example, 60–70°, e.g., approximately 64°); and (C) a second lens unit (U2) having a positive power and comprising a plurality of lens elements, wherein:
  (i) one of the lens elements $L_A$ is a positive lens element which comprises at least one aspheric surface; and
  (ii) another of the lens elements (e.g., $L_4$) has an optical surface $S_2$ which constitutes the long conjugate end of the second lens unit;

wherein:

(a) the first and second lens units are the only lens units of the projection lens;

(b) the projection lens has a field of view in the direction of the long conjugate which is greater than 82 degrees and preferably greater than or equal to 85 degrees (e.g., a field of view of 88 degrees);

(c) the projection lens is telecentric on the short conjugate side;

(d) the projection lens has an effective back focal length BFL which satisfies the relationship:

$$BFL/f_0 > 2.0;$$

(e) the projection lens has a mechanical spacing $S_{1\text{-}2}$ between $S_1$ and $S_2$ which satisfies the relationship:

$$S_{1\text{-}2}/f_0 > 3.5,$$

where the mechanical spacing is the smaller of the center-to-center distance and the edge-to-edge distance between $S_1$ and $S_2$ for an unfolded optical axis; and (f) the projection lens has a lateral color LC in its short conjugate focal plane which satisfies the relationships:

$$LC_{red\text{-}blue} < 0.0012 \cdot f_0 \text{ (preferably} < 0.001 \cdot f_0),$$

$$LC_{red\text{-}green} < 0.0012 \cdot f_0 \text{ (preferably} < 0.001 \cdot f_0), \text{ and}$$

$$LC_{blue\text{-}green} < 0.0012 \cdot f_0 \text{ (preferably} < 0.001 \cdot f_0),$$

where (i) the red-blue and red-green relationships are satisfied over the full field in the short conjugate focal plane, (ii) the blue-green relationship is satisfied over at least 95% of the full field in the short conjugate focal plane, and (iii) the red, green, and blue wavelengths are 0.62 micrometers, 0.55 micrometers, and 0.46 micrometers, respectively.

Preferably, the $BFL/f_0$ ratio is greater than 2.5. Similarly, the $S_{1\text{-}2}/f_0$ ratio is preferably greater than 4.0 and most preferably greater than 4.5.

Also, in addition to providing a large space between the short conjugate end of the first lens unit and the long conjugate end of the second lens unit, the projection lenses of the invention also preferably provide a large space between the short conjugate end of first lens unit (i.e., the $S_1$ surface) and the projection lens' aperture stop. In particular, the spacing $S_{1\text{-}AS}$ between the center of optical surface $S_1$ and the center of the aperture stop preferably satisfies the relationship:

$$S_{1\text{-}AS}/f_0 > 3.5.$$

It should be noted that the projection lens can have a physical aperture stop or can use the output of the illumination system as a virtual aperture stop. In either case, the aperture stop is preferably on the short conjugate side of the reflective surface. Alternatively, but less preferred, the aperture stop can be located at the reflective surface, e.g., an aperture stop can be applied to or painted onto the reflective surface. Note that for the projection lens to operate efficiently, the aperture stop should either completely clear the reflective surface or should be completely on the reflective surface, i.e., the reflective surface should not intersect and thus cut off a part of the aperture stop.

Although an aperture stop on the long conjugate side of the reflective surface can be used in the practice of the invention, such a location for the aperture stop is generally not preferred since the second lens unit then must have a long focal length to produce a telecentric entrance pupil for the overall lens.

In terms of distortion, the projection lenses of the invention preferably have a percentage distortion D which:

(i) over the full field has a magnitude that is less than 1.0 (i.e., at all points of the field the magnitude of the distortion is less than 1.0%); and (ii) over the half field-to-full field range has a maximum value $D_{max}$ and a minimum value $D_{min}$ which satisfy the relationship:

$$|D_{max} - D_{min}| < 0.4.$$

The second of these criteria for a high level of distortion correction is directed to the phenomenon known as "apparent distortion." When looking at an image on a screen, users are particularly sensitive to curvature along the top or bottom of the image. Such curvature will arise if the distortion varies between, for example, the middle of the top of the screen to the edges of the top of the screen. For a typical 16:9 format, the middle of the top of the screen corresponds to the half field of view and the edges of the top of the screen correspond to the full field of view. By keeping the variation in percentage distortion over this range below 0.4, the problems of apparent distortion is avoided.

Preferably, the projection lenses of the invention achieve the above features of the invention which less than eight lens elements. Most preferably, two of the lens elements are in the form of a doublet so that assembly of the lens requires positioning of less than seven lens components.

Additional features and advantages of the invention are set forth in the detailed description which follows, and in part will be readily apparent to those skilled in the art from that description or recognized by practicing the invention as described herein.

It is to be understood that both the foregoing general description and the following detailed description are merely exemplary of the invention, and are intended to provide an overview or framework for understanding the nature and character of the invention.

Figure 1:
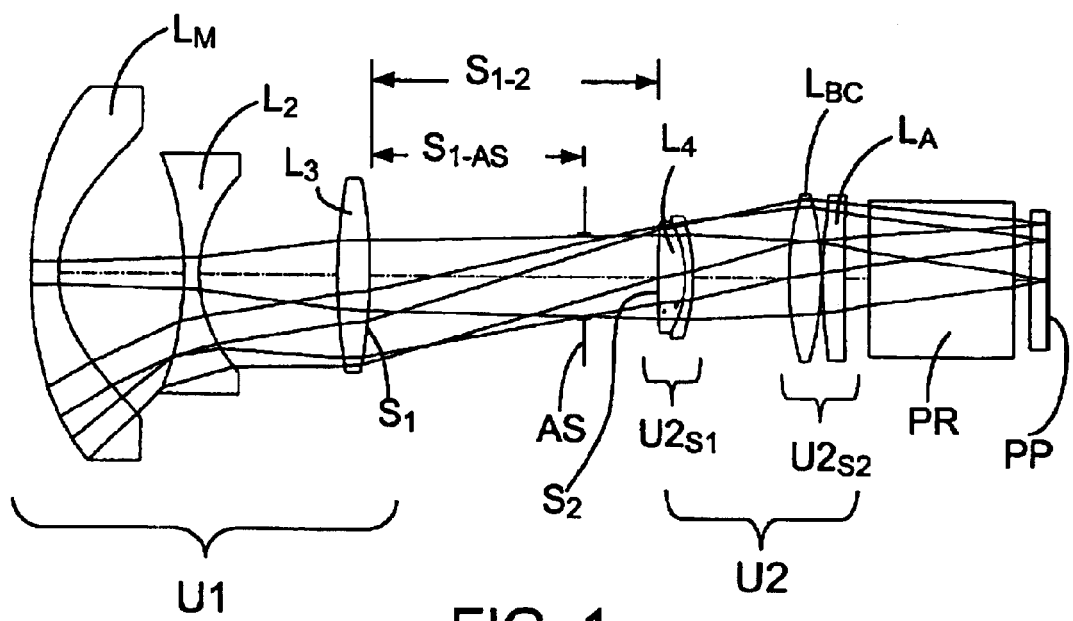
FIGS. 1, 2, and 3A are schematic side views of representative projection lenses constructed in accordance with the invention in an unfolded configuration.

The foregoing drawings, which are incorporated in and constitute part of the specification, illustrate the preferred embodiments of the invention. As with the written description, these drawings are explanatory only and should not be considered as restrictive of the invention.

DESCRIPTION OF THE PREFERRED EMBODIMENTS

The projection lenses of the present invention are of the retrofocus or the inverted telephoto type and consist of two lens units, i.e., a negative unit (U1) on the long conjugate side and a positive unit (U2) on the short conjugate side, which are separated by a physical or virtual aperture stop.

The use of this overall lens form to produce an image of a pixelized panel has various advantages. Thus, telecentricity can be achieved by locating the lens' aperture stop in the front focal plane of the second positive unit. Additional advantages, illustrated by the examples presented below, are the ability to achieve a long effective back focal length and the ability to provide a wide field of view in the direction of the lens' long conjugate. As discussed above, both of these characteristics are particularly useful in rear projection systems, where the lens must have a wide field of view to achieve the smallest possible overall package size, and where there is a need to accommodate beam splitting prisms and/or beam guiding prisms between the lens and the pixelized panel. These prisms may include TIR prisms, polarizing beam splitters, and/or color splitting prisms.

The lenses of the invention achieve a high level of distortion correction by using one or more aspherical surfaces in the first lens unit. Specifically, the $L_M$ lens element has one and preferably two aspherical surfaces. The variation of thickness of the $L_M$ lens element is preferably minimized to reduce the molding time and thus the cost of that element. In particular, $L_M$ preferably has a center thickness $t_c$ and an edge thickness $t_e$ which satisfy the relationship:

$$t_e/t_c \leq 3.0,$$

where $t_e$ is determined at the clear aperture of the short conjugate surface of $L_M$ (i.e., surface 2 in Tables 1–3).

Some residual distortion, as well as spherical aberration of the lens' entrance pupil, is corrected through the use of one or more aspherical surfaces in the second lens unit. The spherical aberration of the entrance pupil should be minimized to achieve telecentricity for any arbitrary point in the object plane of the lens. Preferably, the aspherical surfaces of the first and second lens units are formed on plastic lens elements.

The most critical aberration that moist be corrected is the lens' lateral color. The lenses of the invention preferably achieve such correction using anomalous dispersion glasses (also known as "abnormal partial dispersion" glasses) as discussed in U.S. Pat. No. 5,625,495, entitled "Telecentric Lens Systems For Forming an Image of an Object Composed of Pixels," and/or by using the techniques of U.S. Pat. No. 6,195,209, entitled "Projection Lenses Having Reduced Lateral Color for Use with Pixelized Panels," the contents of both of which are incorporated herein by reference.

As illustrated by the examples set forth below, the abnormal partial dispersion of acrylic can in some cases be sufficient to provide lateral color correction, including secondary lateral color correction, without the need for anomalous dispersion glasses. In particular, this can be the case if the $L_M$ lens element is composed of acrylic and has a sufficiently strong negative power.

The prescription of Table 3 illustrates such a projection lens in which lateral color correction is achieved through the use of a sufficiently strong $L_M$ element composed of acrylic. However, the $t_e/t_c$ ratio for the $L_M$ lens element of this prescription is greater than 3 (specifically, 3.8), which makes the element expensive to mold due to the need for long molding cycle times. The $L_M$ lens elements of the projection lenses of Tables 1 and 2, on the other hand, have $t_e/t_c$ ratios that are less than 3 (specifically, 2.8 for Table 1 and 2.9 for Table 2), and thus can be molded economically. These lens elements have less negative power than the $L_M$ lens element of Table 3. Accordingly, the prescription of Table 1 uses two lens elements composed of anomalous dispersion glass in the second lens unit (i.e. elements $L_4$ and $L_{BC}$ which are composed of OHARA S-FPL51 glass), while the prescription of Table 2 uses one such element (i.e., element $L_{BC}$ which again is composed of S-FPL51 glass). Other anomalous dispersion glasses besides S-FPL51 can, of course, be used in the practice of the invention.

As discussed above, the use of reflective pixelized panels can exacerbate the problem of ghost formation since such panels are designed to reflect light. In accordance with the invention it has been found that this problem can be readily addressed during the lens design process by ensuring that the axial marginal ray traced through the projection lens from the projection lens' short conjugate focal plane intersects each lens surface of the projection lens at an angle of incidence θi that is greater than 1.5 degrees.

For example, a constraint of this type can be incorporated in the lens design computer program at the beginning of the design process. Alternatively, as a lens design is being developed, the shape of offending surfaces can be changed to meet this criterion. Because the height of the axial marginal ray tends to be small at the long conjugate end of the lens, the angle of incidence of that ray with the lens surfaces of the $L_M$ lens element and any lens surfaces which may be on the long conjugate side of $L_M$ need not be greater than 1.5 degrees, i.e., θi may be less than, equal to, or greater than 1.5 degrees for these surfaces. Typically, the $L_M$ lens element constitutes the long conjugate end of the projection lens so that only the $L_M$ lens element is excluded from the θi>1.5 degrees criterion.

The prescription of Table 3 illustrates this aspect of the invention. The smallest θi for lens elements $L_2$ through $L_A$ for this example is 1.54°, while for the $L_M$ lens element, it is 0.82°. This projection lens was built and tested, and found to have very good ghost performance.

For a rear projection television, the distance to the screen is known and thus gross changes in the focus of a projection lens are not normally required. However, to take account of manufacturing tolerances; small focus adjustments are routinely made during the process of assembling a projection lens into a rear projection television. To facilitate that process, the projection lenses of the present invention provide two mechanisms for focus adjustment.

Specifically, the second lens unit preferably comprises two lens subunits ($U2_{S1}$ and $U2_{S2}$), with the first lens subunit being on the long conjugate side of the second lens unit and the second lens subunit being on the short conjugate side. With this structure, focusing can be done by moving either the entire second lens unit or just the second lens subunit.

Without intending limit it in any manner, the present invention will be more fully described by the following examples.

EXAMPLES

Figure 2:
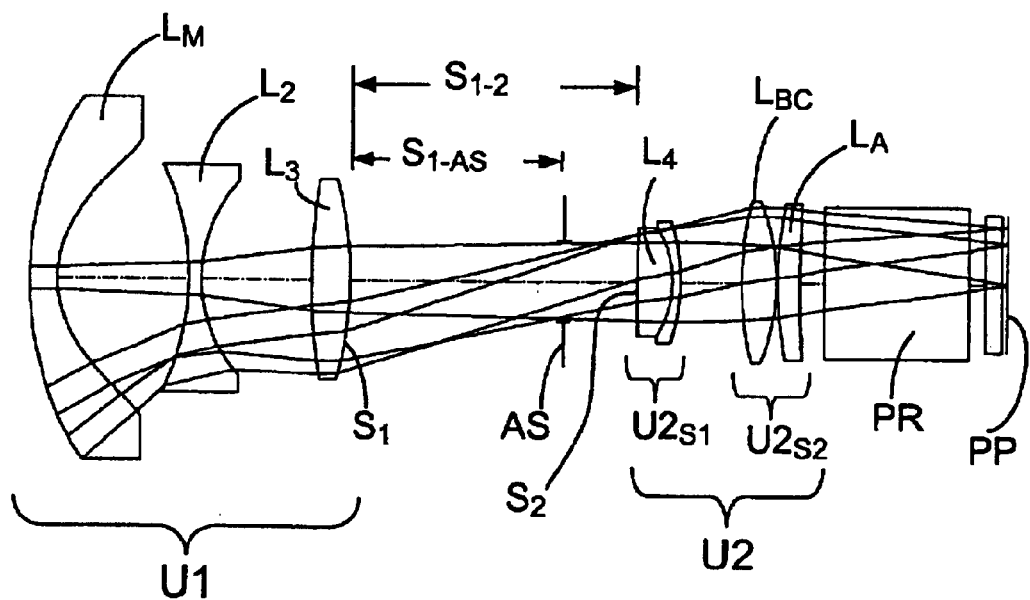
Figure 3A:
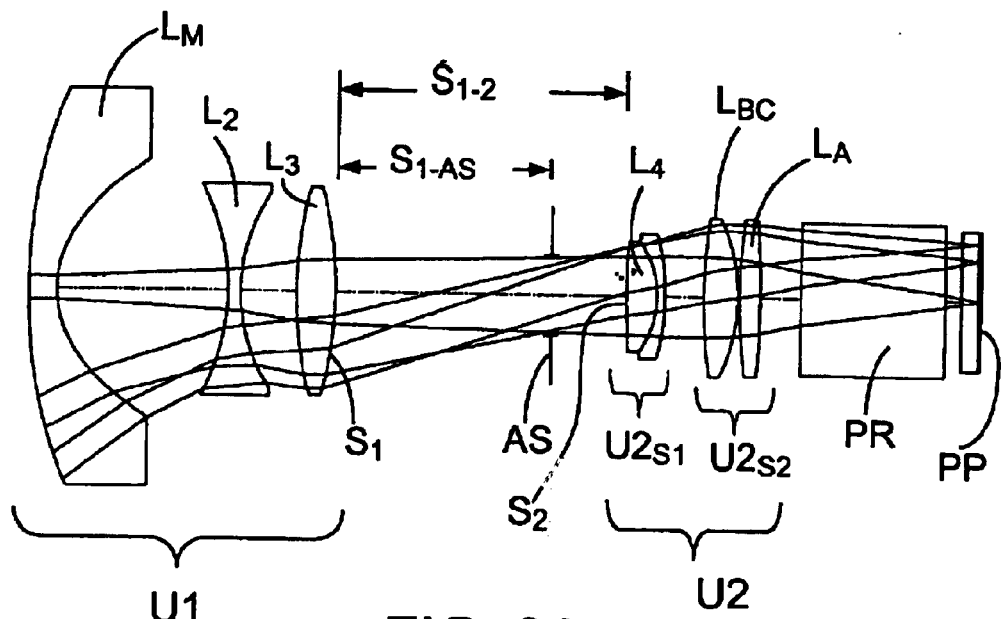
Figure 3B:
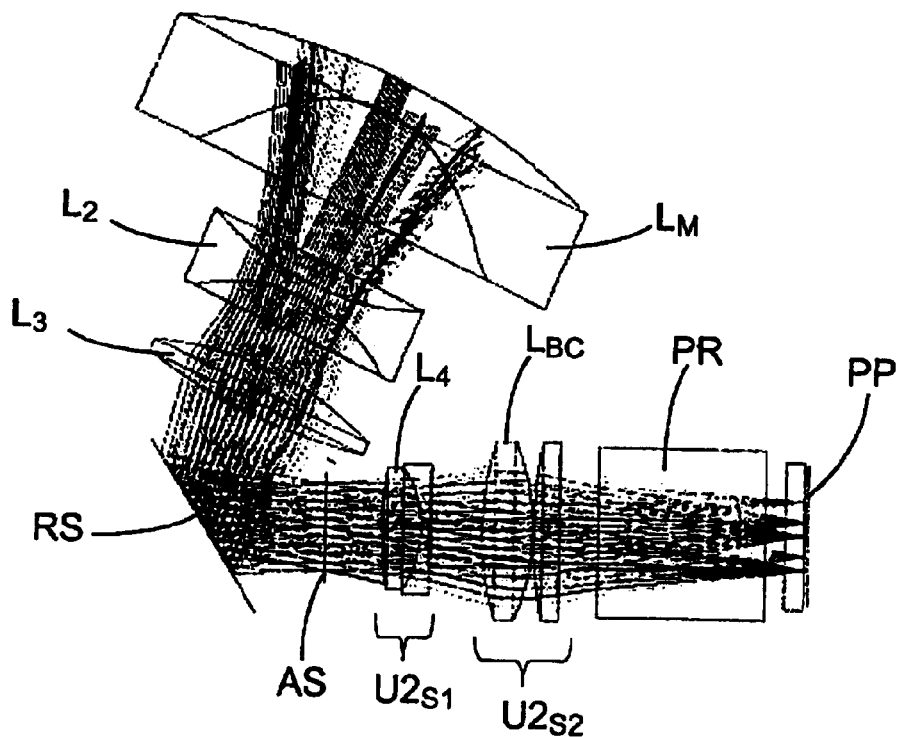
FIG. 3B is a schematic side view of the projection lens of FIG. 3A in its folded configuration. During use, the projection lenses of FIGS. 1 and 2 are similarly folded.
Figure 4:
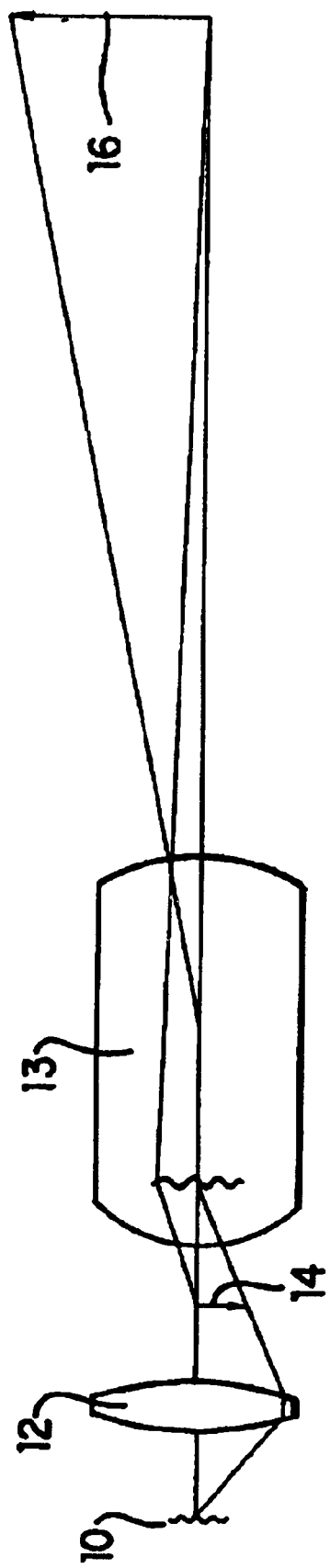
FIG. 4 is a schematic diagram showing an overall projection lens system in which the projection lenses of the present invention can be used. As with FIGS. 1, 2, and 3A, for ease of illustration, this figure does not show the projection lens in its folded configuration. Similarly, the details of the telecentricity of the projection lens are not shown in FIG. 4.
Figure 1:
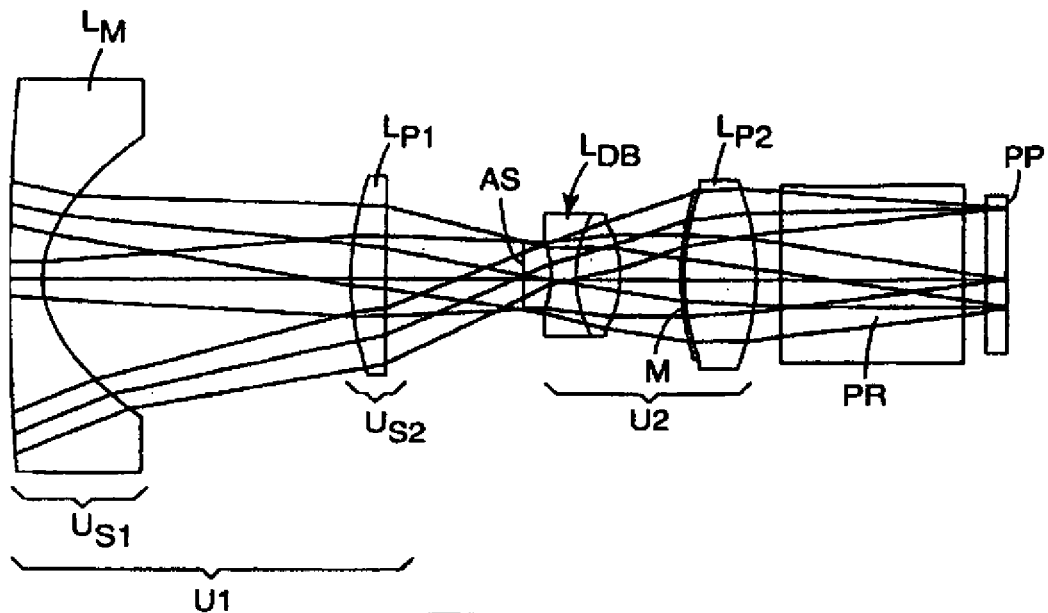
Figure 2:
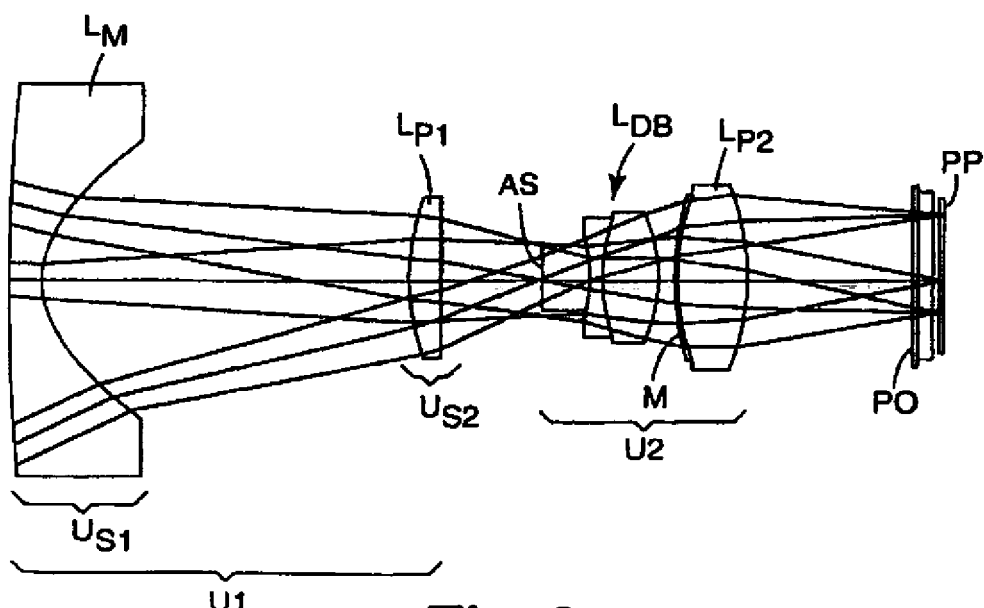
Figure 3:
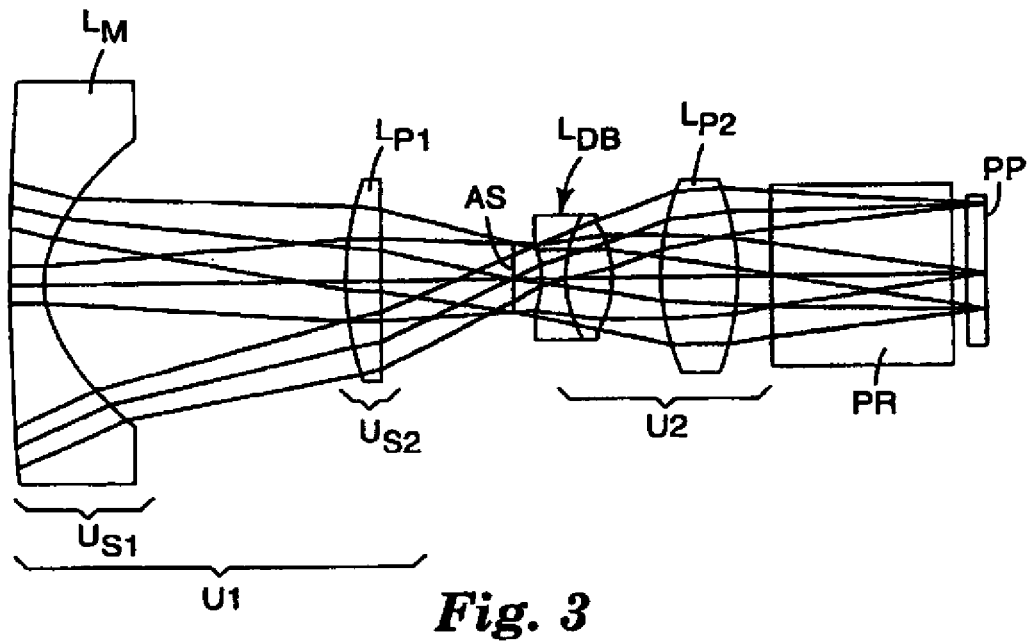
Figure 4:
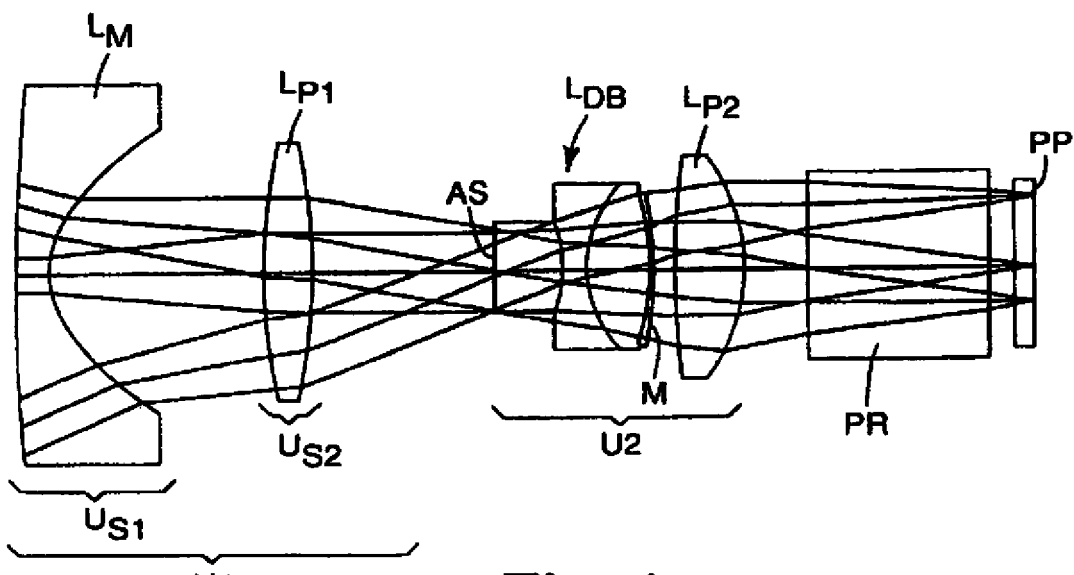
Figure 5:
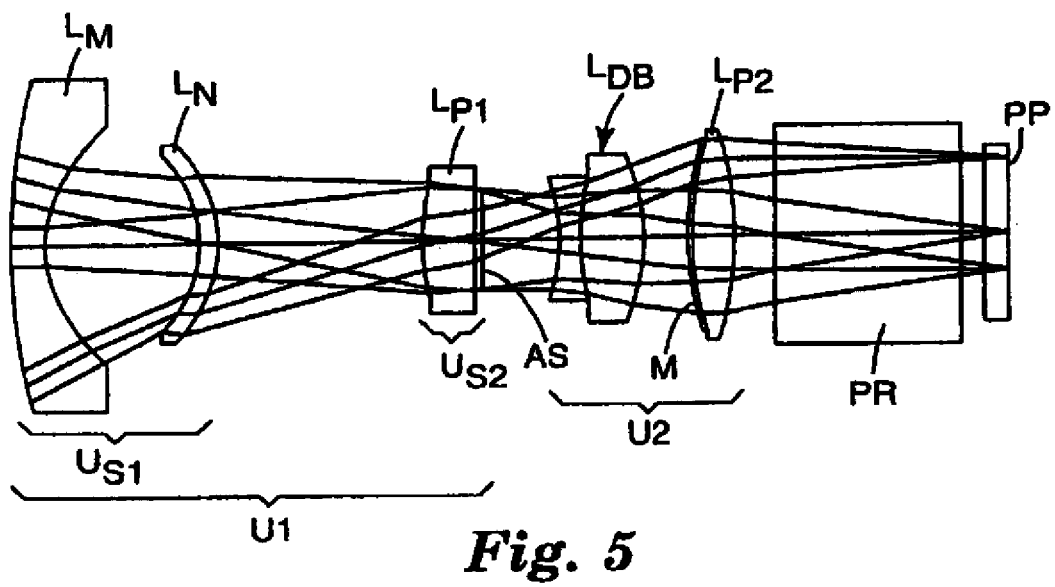

FIGS. 1–3 and Tables 1–3 illustrate representative projection lenses constructed in accordance with the invention.

OHARA designations are used for the various glasses employed in the lens systems. Equivalent glasses made by other manufacturers (e.g., HOYA or SCHOTT) can be used in the practice of the invention. Industry acceptable materials are used for the plastic elements.

The aspheric coefficients set forth in the tables are for use in the following equation:

$$z = \frac{cy^2}{1 + [1 - (1+k)c^2 y^2]^{1/2}} + Dy^4 + Ey^6 + Fy^8 + Gy^{10} + Hy^{12} + Iy^{14}$$

where z is the surface sag at a distance y from the optical axis of the system, c is the curvature of the lens at the optical axis, and k is a conic constant, which is zero except where indicated in the prescriptions of Tables 1–3.

The designation "a" associated with various surfaces in the tables represents an aspherical surface, i.e., a surface for which at least one of D, E, F, G, H, or I in the above equation is not zero; and the designation "c" indicates a surface for which k in the above equation is not zero. The various planar structures located on the short conjugate side of U2 in the figures and tables represent components (e.g., prism PR) which are used with or are a part of the pixelized panel. They do not constitute part of the projection lens. Surfaces 7 and 8 in the prescription tables are vignetting surfaces which are included in the design process to take account of the folding of the optical axis by the reflective surface. All dimensions given in Tables 1–3 and in Table 4 are in millimeters.

The prescription tables are constructed on the assumption that light travels from left to right in the figures. In actual practice, the viewing screen will be on the left, and the pixelized panel will be on the right, and light will travel from right to left. In particular, the references in the prescription tables to objects/images and entrance/exit pupils are reversed from that used in the rest of the specification. The pixelized panel is shown in the FIGS. 1–3 by the designation "PP" and the aperture stop is shown by the designation "AS".

The focal lengths of the lens units making up the projection lenses of Tables 1–3 are set forth in Table 4 where $f_1$ is the focal length of U1 and $f_2$ is the focal length of U2. Also set forth in this table are the BFL, $S_{1-2}$, $S_{1-AS}$, and $t_e$ values for these examples.

Table 5 sets forth the lateral color and distortion performance of the examples, where the lateral color performance is given in millimeters and the distortion performance in percent. The full field of view in the direction of the long conjugate for each example is 88°. As set forth in Tables 1–3, each of these examples has an entrance pupil (exit pupil in Tables 1–3) which is telecentric.

The projection lenses of Examples 1–3 thus have the desired structural and performance properties discussed above, which make them particularly well-suited to the manufacture of compact projection televisions and monitors which employ pixelized panels.

Although specific embodiments of the invention have been described and illustrated; it is to be understood that a variety of modifications which do not depart from the scope and spirit of the invention will be evident to persons of ordinary skill in the art from the foregoing disclosure.

TABLE 1

| Surf. No. | Type | Radius | Thickness | Glass | Clear Aperture Diameter |
|---|---|---|---|---|---|
| 1 | a | 68.6903 | 5.00000 | ACRYLIC | 66.95 |
| 2 | ac | 21.5816 | 22.54471 | | 50.28 |
| 3 | | −55.9882 | 2.70000 | S-NSL36 | 40.87 |

TABLE 1-continued

| | | | | | |
|---|---|---|---|---|---|
| 4 | | 25.0606 | 25.32549 | | 33.35 |
| 5 | | 98.3054 | 5.80000 | S-TIH23 | 32.75 |
| 6 | | −98.3054 | 19.00000 | | 32.39 |
| 7 | | ∞ | 0.00000 | | 22.74 |
| 8 | | ∞ | 20.00000 | | 22.74 |
| 9 | | Aperture stop | 13.34571 | | 14.50 |
| 10 | | 164.5208 | 5.00000 | S-FPL51 | 18.43 |
| 11 | | −20.7868 | 1.40000 | S-TIH53 | 19.06 |
| 12 | | −36.2396 | 17.37473 | | 20.02 |
| 13 | | 51.0935 | 6.00000 | S-FPL51 | 27.97 |
| 14 | | −51.0935 | 0.20000 | | 28.14 |
| 15 | ac | 83.9827 | 4.00000 | ACRYLIC | 27.63 |
| 16 | | 600.0000 | 4.44000 | | 27.07 |
| 17 | | ∞ | 26.00000 | S-BSL7 | 26.02 |
| 18 | | ∞ | 3.00000 | | 23.00 |
| 19 | | ∞ | 3.00000 | S-FSL5 | 23.00 |
| 20 | | ∞ | 0.43968 | | 23.00 |

Symbol Description a — Polynomial asphere
c — Conic section

Conics

| Surface Number | Constant |
|---|---|
| 2 | −9.0000E−01 |
| 15 | −1.2000E+01 |

Even Polynomial Aspheres

| Surf. No. | D | E | F | G | H | I |
|---|---|---|---|---|---|---|
| 1 | 3.0000E−07 | 7.4044E−10 | 4.9826E−13 | −9.7337E−16 | 5.4334E−19 | 4.1323E−23 |
| 2 | 1.3625E−06 | −1.9071E−09 | 2.7739E−12 | −4.3233E−15 | −1.9743E−17 | 6.2349E−21 |
| 15 | −1.4990E−06 | −1.4775E−08 | 2.6451E−11 | 1.8371E−13 | −1.5357E−15 | 2.9485E−18 |

First Order Data

| | | | |
|---|---|---|---|
| f/number | 2.40 | Overall Length | 834.750 |
| Magnification | −0.0154 | Forward Vertex Distance | 184.570 |
| Object Height | −670.30 | Barrel Length | 184.131 |
| Object Distance | −650.180 | Entrance Pupil Distance | 33.1599 |
| Effective Focal Length | 10.5001 | Exit Pupil Distance | −2209.37 |
| Image Distance | 0.439685 | Stop Diameter | 14.450 |
| Stop Surface Number | 9 | Distance to Stop | 0.00 |

| Element Number | Surface Numbers | | Power | f' |
|---|---|---|---|---|

First Order Properties of Elements

| | | | | |
|---|---|---|---|---|
| 1 | 1 | 2 | −0.15141E−01 | −66.048 |
| 2 | 3 | 4 | −0.30366E−01 | −32.932 |
| 3 | 5 | 6 | 0.15897E−01 | 62.903 |
| 4 | 10 | 11 | 0.26767E−01 | 37.360 |
| 5 | 11 | 12 | −0.16807E−01 | −59.498 |
| 6 | 13 | 14 | 0.19130E−01 | 52.273 |
| 7 | 15 | 16 | 0.50695E−02 | 197.26 |

First-Order Properties of Doublets

| | | | | |
|---|---|---|---|---|
| 4 5 | 10 | 12 | 0.96527E−02 | 103.60 |

TABLE 2

| Surf. No. | Type | Radius | Thickness | Glass | Clear Aperture Diameter |
|---|---|---|---|---|---|
| 1 | a | 65.0000 | 5.00000 | ACRYLIC | 66.23 |
| 2 | ac | 20.0000 | 23.57996 | | 48.77 |
| 3 | | −48.1592 | 2.30000 | S-BSL7 | 39.47 |
| 4 | | 26.6019 | 19.96874 | | 33.51 |
| 5 | | 112.4195 | 7.00000 | S-LAM66 | 34.54 |

TABLE 2-continued

| | | | | |
|---|---|---|---|---|
| 6 | | −69.6643 | 19.00000 | | 34.19 |
| 7 | | ∞ | 0.00000 | | 21.11 |
| 8 | | ∞ | 20.00000 | | 21.11 |
| 9 | | Aperture stop | 13.50000 | | 13.60 |
| 10 | | 400.0000 | 6.40000 | S-NSL36 | 17.18 |
| 11 | | −17.8399 | 1.40000 | S-NPH1 | 18.69 |
| 12 | | −35.6614 | 11.21600 | | 20.08 |
| 13 | | 65.2242 | 6.20000 | S-FPL51 | 27.06 |
| 14 | | −38.7852 | 0.20000 | | 27.45 |
| 15 | ac | 61.9356 | 4.00000 | ACRYLIC | 26.99 |
| 16 | | 248.0375 | 4.44000 | | 26.45 |
| 17 | | ∞ | 26.00000 | S-BSL7 | 25.56 |
| 18 | | ∞ | 3.00000 | | 23.00 |
| 19 | | ∞ | 3.00000 | S-FSL5 | 23.00 |
| 20 | | ∞ | 0.96264 | | 23.00 |

Symbol Description a — Polynomial asphere
c — Conic section

Conics

| Surface Number | Constant |
|---|---|
| 2 | −8.0000E−01 |
| 15 | −1.2000E+01 |

Even Polynomial Aspheres

| Surf. No. | D | E | F | G | H | I |
|---|---|---|---|---|---|---|
| 1 | 8.3311E−08 | 4.8873E−11 | −2.4183E−14 | 1.5006E−16 | 1.2480E−19 | −2.1695E−23 |
| 2 | 1.0891E−06 | −3.0558E−09 | −1.6537E−12 | −1.3816E−14 | 6.1693E−18 | −1.7316E−20 |
| 15 | 2.7425E−06 | −3.2614E−08 | 1.0675E−10 | 3.0153E−13 | −4.7534E−15 | 1.1523E−17 |

First Order Data

| | | | |
|---|---|---|---|
| f/number | 2.40 | Overall Length | 830.609 |
| Magnification | −0.0154 | Forward Vertex Distance | 177.167 |
| Object Height | −670.30 | Barrel Length | 176.205 |
| Object Distance | −653.441 | Entrance Pupil Distance | 32.6682 |
| Effective Focal Length | 10.5406 | Exit Pupil Distance | −592.081 |
| Image Distance | 0.962640 | Stop Diameter | 13.558 |
| Stop Surface Number | 9 | Distance to Stop | 0.00 |

| Element Number | Surface Numbers | | Power | f |
|---|---|---|---|---|

First Order Properties of Elements

| | | | | |
|---|---|---|---|---|
| 1 | 1 | 2 | −0.16464E−01 | −60.737 |
| 2 | 3 | 4 | −0.30560E−01 | −32.722 |
| 3 | 5 | 6 | 0.18427E−01 | 54.267 |
| 4 | 10 | 11 | 0.30275E−01 | 33.031 |
| 5 | 11 | 12 | −0.22063E−01 | −45.325 |
| 6 | 13 | 14 | 0.20087E−01 | 49.782 |
| 7 | 15 | 16 | 0.60242E−02 | 166.00 |

First-Order Properties of Doublets

| | | | | | |
|---|---|---|---|---|---|
| 4 | 5 | 10 | 12 | 0.77986E−02 | 128.23 |

TABLE 3

| Surf. No. | Type | Radius | Thickness | Glass | Clear Aperture Diameter |
|---|---|---|---|---|---|
| 1 | a | 115.7551 | 5.00000 | ACRYLIC | 68.90 |
| 2 | ac | 18.2247 | 30.79387 | | 46.22 |
| 3 | | −39.9900 | 2.30000 | S-FSL5 | 35.54 |
| 4 | | 31.4960 | 10.06629 | | 32.95 |
| 5 | | 70.9800 | 7.00000 | S-LAH60 | 34.89 |
| 6 | | −70.9800 | 19.00000 | | 34.63 |
| 7 | | ∞ | 0.00000 | | 20.99 |

TABLE 3-continued

| | | | | | |
|---|---|---|---|---|---|
| 8 | | ∞ | 20.00000 | | 20.99 |
| 9 | | Aperture stop | 13.51083 | | 13.30 |
| 10 | | 151.3950 | 5.60000 | S-FSL5 | 17.52 |
| 11 | | −16.3630 | 1.40000 | S-TIH3 | 18.54 |
| 12 | | −44.3200 | 6.94450 | | 20.22 |
| 13 | | 88.8000 | 6.19200 | S-FSL5 | 25.62 |
| 14 | | −32.0600 | 0.20000 | | 26.32 |
| 15 | ac | 80.0000 | 3.80000 | ACRYLIC | 26.30 |
| 16 | | −173.2000 | 7.27437 | | 26.12 |
| 17 | | ∞ | 26.00000 | S-BSL7 | 25.22 |
| 18 | | ∞ | 3.00000 | | 23.00 |
| 19 | | ∞ | 3.00000 | S-FSL5 | 23.00 |
| 20 | | ∞ | 0.44000 | | 23.00 |

Symbol Description a — Polynomial asphere
c — Conic section

Conics

| Surface Number | Constant |
|---|---|
| 2 | −1.7000E+00 |
| 15 | −1.2000E+01 |

Even Polynomial Aspheres

| Surf. No. | D | E | F | G | H | I |
|---|---|---|---|---|---|---|
| 1 | 1.6355E−06 | −6.7123E−10 | −2.1297E−13 | 4.0158E−16 | −2.2958E−19 | 7.8973E−23 |
| 2 | 2.1311E−05 | −1.1435E−08 | 2.3241E−11 | −2.6878E−14 | −3.3900E−17 | 2.7502E−20 |
| 15 | −1.3745E−06 | −2.6516E−08 | 1.2304E−10 | 2.2021E−13 | −5.5468E−15 | 1.5689E−17 |

First Order Data

| | | | |
|---|---|---|---|
| f/number | 2.40 | Overall Length | 825.104 |
| Magnification | −0.0154 | Forward Vertex Distance | 171.522 |
| Object Height | −670.30 | Barrel Length | 171.082 |
| Object Distance | −653.582 | Entrance Pupil Distance | 30.4941 |
| Effective Focal Length | 10.5063 | Exit Pupil Distance | −287.053 |
| Image Distance | 0.440001 | Stop Diameter | 13.243 |
| Stop Surface Number | 9 | Distance to Stop | 0.00 |

| Element Number | Surface Numbers | | Power | f' |
|---|---|---|---|---|
| First Order Properties of Elements | | | | |
| 1 | 1 | 2 | −0.22441E−01 | −44.561 |
| 2 | 3 | 4 | −0.28056E−01 | −35.644 |
| 3 | 5 | 6 | 0.23117E−01 | 43.258 |
| 4 | 10 | 11 | 0.32761E−01 | 30.524 |
| 5 | 11 | 12 | −0.28149E−01 | −35.525 |
| 6 | 13 | 14 | 0.20416E−01 | 48.981 |
| 7 | 15 | 16 | 0.89783E−02 | 111.38 |
| First-Order Properties of Doublets | | | | |
| 4   5 | 10 | 12 | 0.45117E−02 | 221.65 |

TABLE 4

| Ex. | $f_0$ | $f_1$ | $f_2$ | BFL | $S_{1-2}$ | $S_{1-AS}$ | $t_e$ |
|---|---|---|---|---|---|---|---|
| 1 | 10.50 | −99.01 | 34.37 | 27.0 | 52.34 | 39.00 | 14.1 |
| 2 | 10.54 | −118.69 | 32.14 | 27.5 | 52.50 | 39.00 | 14.7 |
| 3 | 10.51 | −97.28 | 31.20 | 29.8 | 52.51 | 39.00 | 18.8 |

TABLE 5

| Ex. | $LC_{red\text{-}blue}$[1] | $LC_{red\text{-}green}$[1] | $LC_{blue\text{-}green}$[1] | $LC_{blue\text{-}green}$[2] | $D_{max}$[3] | $D_{min}$[3] | $|D_{max} - D_{min}|$[3] |
|---|---|---|---|---|---|---|---|
| 1 | 0.007 | 0.007 | 0.013 | 0.010 | +0.06 | −0.06 | 0.12 |
| 2 | 0.010 | 0.008 | 0.015 | 0.010 | +0.15 | −0.09 | 0.24 |
| 3 | 0.008 | 0.007 | 0.013 | 0.009 | +0.07 | −0.08 | 0.15 |

[1]Over full field in the short conjugate focal plane.
[2]Over 95% of the full field in the short conjugate focal plane.
[3]Over the half field-to-full field range; the magnitude of the distortion was less than 0.2% throughout the field for each of Examples 1–3.

What is claimed is:

1. A projection lens for forming an enlarged image of a pixelized panel on a screen, said projection lens having an optical axis, a long conjugate side, a short conjugate side, and an effective focal length $f_0$, said lens comprising in order from the long conjugate side to the short conjugate side:

(A) a first lens unit having a negative power and comprising a plurality of lens elements, wherein:
      (i) one of the lens elements $L_M$ is a negative lens element of overall meniscus shape which is convex towards the long conjugate side and comprises at least one aspheric surface; and
      (ii) another of the lens elements has an optical surface $S_1$ which constitutes the short conjugate end of the first lens unit;
   (B) a reflective surface for folding the projection lens' optical axis; and
   (C) a second lens unit having a positive power and comprising a plurality of lens elements, wherein:
      (i) one of the lens elements $L_A$ is a positive lens element which comprises at least one aspheric surface; and
      (ii) another of the lens elements has an optical surface $S_2$ which constitutes the long conjugate end of the second lens unit;

wherein:
   (a) the first and second lens units are the only lens units of the projection lens;
   (b) the projection lens has a field of view in the direction of the long conjugate which is greater than 82 degrees;
   (c) the projection lens is telecentric on the short conjugate side;
   (d) the projection lens has an effective back focal length BFL which satisfies the relationship:

$BFL/f_0 > 2.0$;

(e) the projection lens has a mechanical spacing $S_{1-2}$ between $S_1$ and $S_2$ which satisfies the relationship:

$S_{1-2}/f_0 > 3.5$, where the mechanical spacing is the smaller of the center-to-center distance and the edge-to-edge distance between $S_1$ and $S_2$ for an unfolded optical axis; and
   (f) the projection lens has a lateral color LC in its short conjugate focal plane which satisfies the relationships:

$LC_{red\text{-}blue} < 0.0012 f_0$, $LC_{red\text{-}green} < 0.0012 f_0$, and $LC_{blue\text{-}green} < 0.0012 f_0$, where (i) the red-blue and red-green relationships are satisfied over the full field in the short conjugate focal plane, (ii) the blue-green relationship is satisfied over at least 95% of the full field in the short conjugate focal plane, and (iii) the red, green, and blue wavelengths are 0.62 micrometers, 0.55 micrometers, and 0.46 micrometers, respectively.

2. The projection lens of claim 1 wherein the projection lens has a percentage distortion D which:
   (i) over the full field has a magnitude that is less than 1.0; and
   (ii) over the half-field-to-full field range has a maximum value $D_{max}$ and a minimum value $D_{min}$ which satisfy the relationship:

$|D_{max} - D_{min}| < 0.4$.

3. The projection lens of claim 1 wherein the projection lens comprises an aperture stop between the reflective surface and the second lens unit.

4. The projection lens of claim 3 wherein the spacing $S_{1-AS}$ between the center of $S_1$ and the center of the aperture stop satisfies the relationship:

$S_{1-AS}/f_0 > 3.5$.

5. The projection lens of claim 1 wherein $L_M$ has a center thickness $t_c$ and an edge thickness $t_e$ which satisfy the relationship:

$t_e/t_c \leq 3.0$, where $t_e$ is determined at the clear aperture of the short conjugate surface of $L_M$.

6. The projection lens of claim 1 wherein:
   (i) the second lens unit consists of first and second subunits, the second subunit being on the short conjugate side of the second lens unit; and
   (ii) the projection lens can be focused by moving either the entire second lens unit or just the second subunit.

7. The projection lens of claim 1 wherein the second lens unit comprises at least one lens element which is composed of an anomalous dispersion glass.

8. The projection lens of claim 1 wherein an axial marginal ray traced through the projection lens from the projection lens' short conjugate focal plane intersects each lens surface of the projection lens at an angle of incidence that is greater than 1.5 degrees except for (i) the lens surfaces of $L_M$ and (ii) any lens surfaces which are on the long conjugate side of $L_M$ for which the angle of incidence may be greater than, less than, or equal to 1.5 degrees.

9. The projection lens of claim 1 wherein the total number of lens elements in the projection lens is less than eight.

10. The projection lens of claim 9 wherein two of the lens elements are in the form of a cemented doublet.

11. The projection lens of claim 1 wherein in order from the lone conjugate side to the short conjugate side, the first and second lens units together comprise the following seven lens elements:

(1) $L_M$;

(2) a biconcave negative lens element;

(3) a first biconvex positive lens element which comprises $S_1$;

(4) a second biconvex positive lens element which comprises $S_2$;

(5) a negative lens element;

(6) a biconvex positive lens element; and (7) $L_A$;

wherein the second biconvex positive lens element and the negative lens element form a color-correcting doublet.

12. A projection lens system comprising:
   (a) a pixelized panel; and
   (b) the projection lens of claim 1.

13. The projection lens systems of claim 12 further comprising an illumination system which comprises a light source and illumination optics which forms an image of the light source.

14. The projection lens system of claim 13 wherein the output of the illumination optics forms a virtual aperture stop for the projection lens.

15. A projection lens for forming an enlarged image of a pixelized panel on a screen, said projection lens having an optical axis, a long conjugate side, a short conjugate side, and an effective focal length $f_0$, said lens comprising in order from the long conjugate side to the short conjugate side:

(A) a first lens unit having a negative power and consisting in order from the long conjugate side to the short conjugate side of:
      (1) a negative lens element $L_M$ of overall meniscus shape which is convex towards the long conjugate side and comprises at least one aspheric surface;
      (2) a biconcave negative lens element; and
      (3) a biconvex positive lens element which has an optical surface $S_1$ which constitutes the short conjugation end of the first lens unit;

(B) a reflective surface for folding the projection lens' optical axis; and (C) a second lens unit having a positive power and consisting in order from the long conjugate side to the short conjugate side of:
      (1) a color correcting doublet which consists of: (i) a biconvex positive lens element which has an optical surface $S_2$ which constitutes the long conjugate end of the second lens unit and (ii) a negative lens element;
      (2) a biconvex positive lens element $L_{BC}$; and
      (3) a positive lens element $L_A$ which comprises at least one aspheric surface;

wherein:
      (a) the first and second lens units are the only lens units of the projection lens;
      (b) the projection lens has a field of view in the direction of the long conjugate which is greater than 82 degrees;
      (c) the projection lens is telecentric on the short conjugate side;
      (d) the projection lens has an effective back focal length BFL which satisfies the relationship:

$BFL/f_0 > 2.0$; and (e) the projection lens has a spacing $S_{1-2}$ between the center of $S_1$ and the center of $S_2$ which satisfies the relationship:

$S_{1-2}/f_0 > 3.5$.

16. The projection lens of claim 15 wherein the projection lens comprises an aperture stop between the reflective surface and the second lens unit and the spacing $S_{1-AS}$ between the center of $S_1$ and the center of the aperture stop satisfies the relationship:

$S_{1-AS}/f_0 > 3.5$.

17. The projection lens of claim 15 wherein $L_M$ has a center thickness $t_c$ and an edge thickness $t_e$ which satisfy the relationship:

$t_e/t_c \leq 3.0$, where $t_e$ is determined at the clear aperture of the short conjugate surface of $L_M$.

18. The projection lens of claim 16 wherein the projection lens can be focused by moving either the entire second lens unit or just the combination of $L_{BC}$ and $L_A$.

19. The projection lens of claim 15 wherein the second lens unit comprises at least one lens element which is composed of an anomalous dispersion glass.

20. A projection lens system comprising:
   (a) a pixelized panel; and
   (b) the projection lens of claim 15.

* * * * *

UNITED STATES PATENT AND TRADEMARK OFFICE
CERTIFICATE OF CORRECTION

PATENT NO.      : 6,765,731 B1
APPLICATION NO. : 10/402197
DATED           : July 20, 2004
INVENTOR(S)     : Cannon It is certified that error appears in the above-identified patent and that said Letters Patent is hereby corrected as shown below:

Please delete Patent 6,765,731 in its entirety and insert Patent 6,765,731 in its entirety as attached.

Signed and Sealed this
Twenty-first Day of February, 2012

David J. Kappos
*Director of the United States Patent and Trademark Office*

(12) United States Patent
Cannon

(10) Patent No.: US 6,765,731 B1
(45) Date of Patent: Jul. 20, 2004

(54) LOW ELEMENT COUNT PROJECTION LENSES FOR USE WITH PIXELIZED PANELS

(75) Inventor: Bruce L. Cannon, Portland, OR (US)

(73) Assignee: 3M Innovative Properties Company, St. Paul, MN (US)

(*) Notice: Subject to any disclaimer, the term of this patent is extended or adjusted under 35 U.S.C. 154(b) by 0 days.

(21) Appl. No.: 10/402,197

(22) Filed: Mar. 28, 2003

(51) Int. Cl.[7] .............. G02B 9/04; G02B 9/00; G03B 21/00

(52) U.S. Cl. .............. 359/793; 359/651; 359/649; 353/122

(58) Field of Search .............. 359/793, 651, 649, 359/753, 648, 691, 761, 782, 783, 781; 353/122

(56) References Cited

U.S. PATENT DOCUMENTS

| | | | |
|---|---|---|---|
| 4,738,516 A | 4/1988 | Verhoeven et al. | 359/718 |
| 5,299,062 A | 3/1994 | Ogata | 359/571 |
| 5,812,326 A | 9/1998 | Yamada | 359/749 |
| 5,870,228 A | 2/1999 | Kreitzer et al. | 359/649 |
| 6,144,503 A | 11/2000 | Sugano | 359/749 |
| 6,324,014 B1 | 11/2001 | Moskovich | 359/651 |
| 6,471,359 B1 * | 10/2002 | Kim et al. | 353/122 |
| 6,560,041 B2 * | 5/2003 | Ikeda et al. | 359/749 |

OTHER PUBLICATIONS

Smith, Warren J., Modern Optical Engineering: The Design of Optical Systems, (2nd Edition), McGraw-Hill, New York, 1990, pp. 151–154 and 452–453.*

Zemax Development Corporation's documentation entitled "GHO—Ghost Image Analysis," San Diego, California, pp. 9–49 through 9–54 and 9–61 through 9–76, published prior to Mar. 28, 2003.*

U.S. Appl. No. 10/337,959, filed Jan. 7, 2003, Folded, Telecentric Projection Lenses for Use with Pixelized Panels.*

* cited by examiner

*Primary Examiner*—Georgia Epps
*Assistant Examiner*—Tim Thompson
(74) *Attorney, Agent, or Firm*—Bruce E. Black

(57) ABSTRACT

Projection lenses for use with pixelized panels (PP) are provided. The projection lenses have first and second lens units (U1,U2), each of which can contain just two optical components, e.g., $L_M$ and $L_{P_1}$ for the first lens unit and $L_{DB}$ and $L_{P_2}$ for the second lens unit. The second lens unit can contain a hybrid component (e.g., $L_{P_2}$) which comprises a glass base to which is attached a layer (M) of a formable material which has an external surface which is aspheric. The use of a hybrid component allows the projection lens to have reduced thermal drift, a reduced optical component count, and a short barrel length. The first lens unit can include an additional negative lens element $L_N$ to improve the moldability of $L_M$, and the second lens unit can include a molded glass asphere rather than a hybrid component.

25 Claims, 3 Drawing Sheets

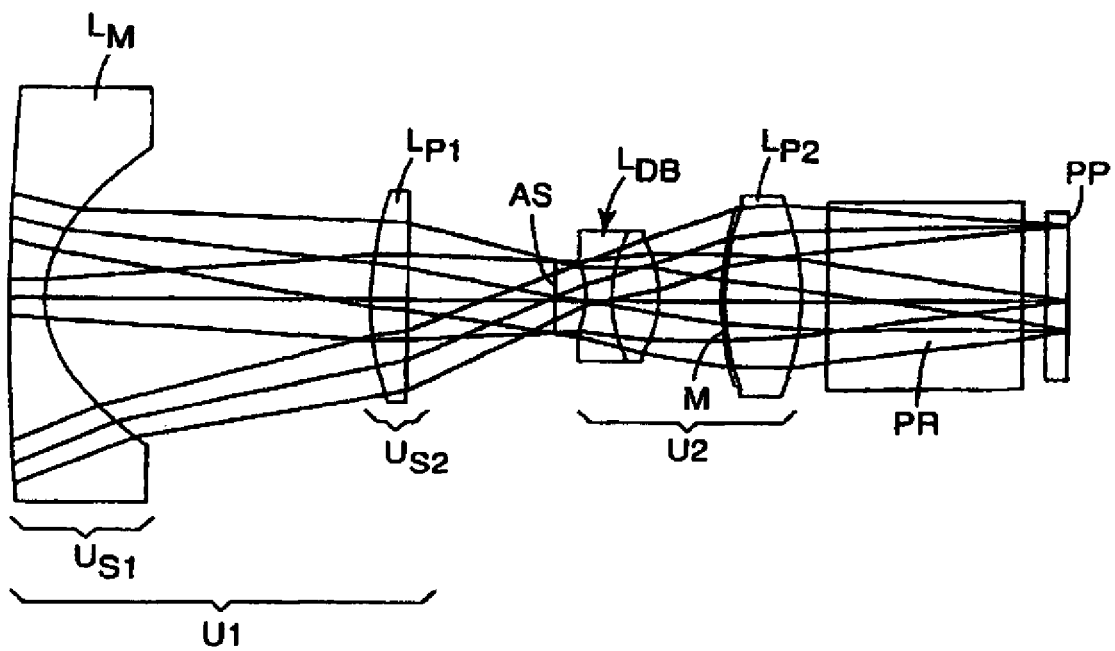

LOW ELEMENT COUNT PROJECTION LENSES FOR USE WITH PIXELIZED PANELS

FIELD OF THE INVENTION

This invention relates to projection lenses and, in particular, to projection lenses for use in forming an image of an object composed of pixels, such as, a DMD, a reflective LCD, a transmissive LCD, or the like.

BACKGROUND OF THE INVENTION

A. Definitions

As used in this specification and in the claims, the following terms shall have the following meanings:

(1) Optical Component

An optical component is a component which has optical power and/or corrects one more monochromatic and/or one or more chromatic aberrations and which requires separate mounting and alignment from other components of the projection lens.

As illustrated by the examples present below, optical components include a single lens elements, a single lens element having a layer of a formable material attached thereto, a cemented doublet, and a cemented doublet having a layer of a formable material attached thereto. Projection lenses having less optical components are preferred to projection lenses having more optical components because having less components simplifies assembly and generally results in a reduction in a projection lens' weight and component cost.

(2) Telecentric

Telecentric lenses are lenses which have at least one pupil at infinity. In terms of principal rays, having a pupil at infinity means that the principal rays are parallel to the optical axis (a) in object space, if the entrance pupil is at infinity, or (b) in image space, if the exit pupil is at infinity.

In practical applications, a telecentric pupil need not actually be at infinity since a lens having an entrance or exit pupil at a sufficiently large distance from the lens' optical surfaces will in essence operate as a telecentric system. The principal rays for such a lens will be substantially parallel to the optical axis and thus the lens will in general be functionally equivalent to a lens for which the theoretical (Gaussian) location of the pupil is at infinity.

Accordingly, as used herein, the terms "telecentric" and "telecentric lens" are intended to include lenses which have a pupil at a long distance from the lens' elements, and the term "telecentric pupil" is used to describe such a pupil at a long distance from the lens' elements. For the projection lenses of the invention, the telecentric pupil distance will in general be at least about 10 times the lens' effective focal length.

(3) Effective Back Focal Length

The effective back focal length (BFL) of a projection lens/pixelized panel combination is the distance between the front surface of the pixelized panel and the vertex of the back surface of the rearward-most optical component of the projection lens when (1) the image of the pixelized panel is located at infinity and (2) the projection lens is located in air, i.e., the space between the rearward-most optical component of the projection lens and the pixelized panel is filled with air as opposed to the glasses making up the prisms, beam splitters, etc. normally used between a projection lens and a pixelized panel.

(4) Barrel Length

Barrel length (BRL) is the distance between the vertex of the front surface of the forward-most optical component of the projection lens and the vertex of the back surface of the rearward-most optical component.

B. Projection Systems

Image projection systems are used to form an image of an object, such as a display panel, on a viewing screen. Such systems can be of the front projection or rear projection type, depending on whether the viewer and the object are on the same side of the screen (front projection) or on opposite sides of the screen (rear projection).

Figure 6:
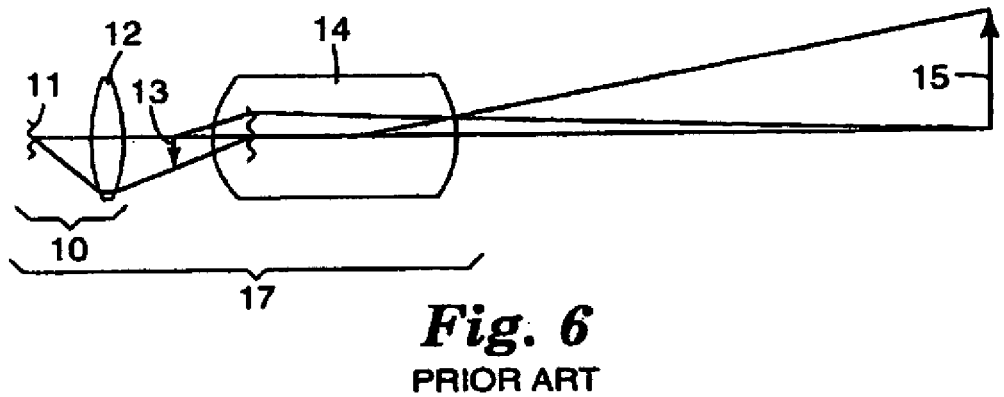

FIG. 6 shows in simplified form the basic components of an image projection system 17 for use with a microdisplay imaging device (also known in the art as a "digital light valve" or a "pixelized imaging device"). In this figure, 10 is an illumination system, which comprises a light source 11 and illumination optics 12 which transfer some of the light from the light source towards the screen, 13 is the imaging device, and 14 is a projection lens which forms an enlarged image of the imaging device on viewing screen 15.

For ease of presentation, FIG. 6 shows the components of the system in a linear arrangement. For a reflective imaging device of the type with which the present invention will typically be used, the illumination system will be arranged so that light from that system reflects off of the imaging device, i.e., the light impinges on the front of the imaging device as opposed to the back of the device as shown in FIG. 6. Also, for such imaging devices, one or more prism assemblies will be located in front of the imaging device and will receive illumination light from the illumination system and will provide imaging light to the projection lens.

For front projection systems, the viewer will be on the left side of screen 15 in FIG. 6, while for rear projection systems, the viewer will be on the right side of the screen. For rear projection systems housed in a cabinet, one or more mirrors are often used between the projection lens and the screen to fold the optical path and thus reduce the system's overall size.

Image projection systems preferably employ a single projection lens which forms an image of: (1) a single imaging device which produces, either sequentially or simultaneously, the red, green, and blue components of the final image; or (2) three imaging devices, one for red light, a second for green light, and a third for blue light. Rather than using one or three imaging devices, some image projection systems have used two or up to six imagers. Also, for certain applications, e.g., large image rear projection systems, multiple projection lenses are used, with each lens and its associated imaging device(s) producing a portion of the overall image. Irrespective of the details of the application, the projection lens generally needs to have a relatively long effective back focal length to accommodate the prisms, beam splitters, and other components normally used with pixelized panels.

A particularly important application of projection systems employing pixelized panels is in the area of rear projection systems which can used as large screen projection televisions (PTVs) and/or computer monitors. Improvements in the technology used to manufacture microdisplays have led to a rise in the popularity of projection systems employing such displays. To compete effectively with the established cathode ray tube (CRT) technology, projection systems based on microdisplays need to be smaller in size and lower in weight than CRT systems having the same screen size.

C. Optical Performance

To display images having a high information content (e.g., to display data), a microdisplay must have a large number of pixels. Since the devices themselves are small, the individual pixels are small, a typical pixel size ranging from 17μ for DMD displays to approximately 8μ or even less for reflective and transmissive LCDs. This means that the projection lenses used in these systems must have a very high level of correction of aberrations. In particular, the lenses need to have a high level of resolution, e.g., a small RMS spot diameter, across the entire field of the lens and a high level of chromatic aberration correction.

The use of a pixelized panel to display data leads to stringent requirements regarding the resolution of the projection lens. This is so because good image quality is required even at the extreme points of the field of view of the lens when viewing data. As will be evident, a clear, undistorted image of a displayed number or letter is just as important at the edge of the field as it is at the center.

A high level of chromatic aberration correction is important because color aberrations can be easily seen in the image of a pixelized panel as a smudging of a pixel or, in extreme cases, the complete dropping of a pixel from the image. Lateral color, i.e., the variation of magnification with color, is particularly troublesome since it manifests itself as a decrease in contrast, especially at the edges of the field. In extreme cases, a rainbow effect in the region of the full field can be seen.

In projection systems employing CRTs a small amount of (residual) lateral color can be compensated for electronically by, for example, reducing the size of the image produced on the face of the red CRT relative to that produced on the blue CRT. With a pixelized panel, however, such an accommodation cannot be performed because the image is digitized and thus a smooth adjustment in size across the full field of view is not possible. A higher level of lateral color correction is thus needed from the projection lens.

High resolution and a high level of color correction are particularly important when an enlarged image of a WINDOWS type computer interface is projected onto a viewing screen. Such interfaces with their parallel lines, bordered command and dialog boxes, and complex coloration, are in essence test patterns for distortion and color. Users readily perceive and object to even minor levels of resolution loss or color aberration in the images of such interfaces.

In addition to high levels of resolution and color correction, projection lenses for use with pixelized panels need to have low levels of ghost generation, especially when the pixelized panel is of the reflective type, e.g., a DMD or reflective LCD.

As known in the art, ghosts can be generated by image light reflecting back towards the object from one of the lens surfaces of a projection lens. Depending upon the shape of the lens surface and its location relative to the object, such reflected light can be re-reflected off of the object so that it reenters the projection lens and is projected onto the screen along with the desired image. Such ghost light always reduces contrast at least to some extent. In extreme cases, a second image can actually be seen on the screen.

Because the operation of DMDs and reflective LCDs depend upon their ability to reflect light efficiently, projection systems employing panels of these types are particularly susceptible to ghost problems. Ghosts can also be generated by light reflecting backwards off of one lens surface and then being re-reflected in a forward direction by a second lens surface. When reflective pixelized panels are used, ghosts generated by reflections from two lens surfaces are generally less troublesome than ghosts generated by a lens surface/pixelized panel combination.

D. Telecentricity

The above-mentioned pixelized panels and, in particular, DMDs, typically operate by reflecting the light from the illumination system which is to form the image at a near-normal angle to the display. Similarly, for transmissive panels, the light passing through the panel typically exits the panel at a near normal angle.

In terms of the projection lens, this translates into a requirement that the lens has a telecentric entrance pupil, i.e., the projection lens must be telecentric in the direction of its short imaging conjugate where the object (pixelized panel) is located. This makes the lens asymmetric about the aperture stop which makes the correction of lateral color more difficult.

E. Cabinet Size

For rear projection systems, there is an ever increasing demand for smaller cabinet sizes (smaller footprints). In terms of the projection lens, this translates into a requirement that the lens has a wide field of view (FOV) in the direction of the image (screen).

The requirement for a large FOV makes it even more difficult to correct the lateral color of the lens. This is especially so when combined with the requirement for a long effective back focal length which itself makes it more difficult to correct lateral color. Also, as mentioned above, the requirement for telecentricity is a third factor which makes the correction of lateral color challenging.

Achieving telecentricity, a relatively long back focal length, and a wide field of view in the direction of the lens' long conjugate, while still maintaining high levels of aberration correction and low levels of ghost generation, is particularly challenging since these various requirements tend to work against one another. To do so while minimizing the number of optical components used in the lens is even more demanding. As illustrated by the examples presented below, the present invention in its preferred embodiments provides projection lenses which satisfy these conflicting criteria.

SUMMARY OF THE INVENTION

In accordance with a first aspect, the invention provides a projection lens for forming an enlarged image of a pixelized panel on a screen, said projection lens having a long conjugate side (image or screen side), a short conjugate side (object or pixelized panel side), an effective focal length $f_o$, and an f-number F/#, said lens comprising in order from the long conjugate side to the short conjugate side:

(A) a first lens unit (U1) consisting in order from the long conjugate side to the short conjugate side of:
  (i) a first lens sub-unit ($U_{S1}$) having a negative power and comprising a negative lens element $L_M$ which (a) has a short conjugate surface which is concave towards the short conjugate side and (b) comprises at least one aspheric surface (preferably, the first lens sub-unit consists of (1) only $L_M$ or (2) the combination of $L_M$ and a negative lens element ($L_N$) that allows $L_M$ to have a configuration which permits more rapid molding (see below)); and
  (ii) a second lens sub-unit ($U_{S2}$) (preferably, the second lens sub-unit consists of only one optical component which, most preferably, is a positive lens element ($L_{P1}$) which preferably has a low dispersion and can have an anomalously low dispersion);

(B) an aperture stop (AS) (preferably the aperture stop is a physical aperture stop, but, if desired, the output of the illumination system can be used as a virtual aperture stop); and (C) a second lens unit (U2) comprising in order from the long conjugate side to the short conjugate side: (i) a doublet ($L_{DB}$); and (ii) a positive lens element ($L_{P2}$) (preferably, the only optical components of the second lens unit are $L_{DB}$ and $L_{P2}$);

wherein:

(a) the first and second lens units (U1,U2) are the only lens units of the projection lens;

(b) the projection lens is telecentric on the short conjugate side;

(c) the projection lens has a lateral color LC in its short conjugate focal plane which in micrometers satisfies the relationships:

$$LC_{red-green} < 4.5 * F/\#(\text{preferably}, LC_{red-green} < 3.5 * F/\#), \text{ and}$$

$$LC_{blue-green} < 5.0 * F/\#(\text{preferably}, LC_{blue-green} < 4.0 * F/\#),$$

where the relationships are satisfied over the full field and the red, green, and blue wavelengths are 0.62 micrometers, 0.55 micrometers, and 0.46 micrometers, respectively;

(d) the projection lens has an RMS spot diameter $D_{rms}$ in its short conjugate focal plane which in micrometers satisfies the relationship:

$$D_{rms} < 4.5 * F/\#(\text{preferably}, D_{rms} < 3.5 * F/\#),$$

where the relationship is satisfied over the full field for green light having a wavelength of 0.55 micrometers; and (e) the second lens unit (U2) comprises a layer (M) of a formable material attached to the doublet ($L_{DB}$) or to the positive lens element ($L_P$) (preferably, to $L_P$), said layer having an external surface which is aspheric.

In accordance with this aspect of the invention, the projection lens preferably satisfies some of the following relationships and, most preferably, all of these relationships:

$$FOV > 70°,$$

$$BFL/f_0 > 1.5, \text{ and/or}$$

$$BRL/f_0 < 10.$$

In accordance with a second aspect, the invention provides a projection lens for forming an enlarged image of a pixelized panel on a screen, said projection lens having a long conjugate side (image or screen side), a short conjugate side (object or pixelized panel side), an effective focal length $f_0$, and an f-number F/#, said lens comprising in order from the long conjugate side to the short conjugate side:

(A) a first lens unit (U1) consisting in order from the long conjugate side to the short conjugate side of:

(i) a first lens sub-unit ($U_{S1}$) having a negative power and consisting of:

a first negative lens element ($L_{N1}$) which (a) has a short conjugate surface which is concave towards the short conjugate side and (b) comprises at least one aspheric surface, and optionally, a second negative lens element ($L_{N}$); and (ii) a second lens sub-unit ($U_{S2}$) which consists of a first positive lens element ($L_{P1}$) which, as discussed above, preferably has a low dispersion and can have an anomalously low dispersion;

(B) an aperture stop (AS) (as above, the aperture stop is preferably a physical aperture stop but can be a virtual aperture stop); and (C) a second lens unit (U2) consisting in order from the long conjugate side to the short conjugate side of:

(i) a doublet ($L_{DB}$); and (ii) a second positive lens element ($L_{P2}$);

wherein:

(a) the first and second lens units (U1,U2) are the only lens units of the projection lens;

(b) the projection lens is telecentric on the short conjugate side;

(c) the projection lens has a lateral color LC in its short conjugate focal plane which in micrometers satisfies the relationships:

$$LC_{red-green} < 4.5 * F/\#(\text{preferably}, LC_{red-green} < 3.5 * F/\#), \text{ and}$$

$$LC_{blue-green} < 5.0 * F/\#(\text{preferably}, LC_{blue-green} < 4.0 * F/\#),$$

where the relationships are satisfied over the full field and the red, green, and blue wavelengths are 0.62 micrometers, 0.55 micrometers, and 0.46 micrometers, respectively;

(d) the projection lens has an RMS spot diameter $D_{rms}$ in its short conjugate focal plane which in micrometers satisfies the relationship:

$$D_{rms} < 4.5 * F/\#(\text{preferably}, D_{rms} < 3.5 * F/\#),$$

where the relationship is satisfied over the full field for green light having a wavelength of 0.55 micrometers;

(e) the projection lens has a full field of view in the direction of the long conjugate which is greater than 70 degrees;

(f) the projection lens has an effective back focal length BFL which satisfies the relationship:

$$BFL/f_0 > 1.5;$$

(g) the projection lens has a barrel length BRL which satisfies the relationship:

$$BRL/f_0 < 10; \text{ and}$$

(h) the second positive lens element ($L_{P2}$) is composed at least in part of glass and comprises an aspheric surface.

The use of a second positive lens element which is glass-based and comprises an aspheric surface provides the projection lens with reduced thermal drift as it is heated from room temperature to its operating temperature (e.g., −40° C.), while at the same time allowing the second lens unit to have a single optical component with an aspheric surface in the vicinity of the unit's rear vertex, the location where an aspheric surface is most effective in correcting aberrations, e.g., aberrations associated with the one or more prisms normally used with reflective pixelized panels.

In accordance with either the first or second aspects of the invention, the projection lens preferably satisfies the following relationship:

$$f_P/f_0 < 3.0,$$

where $f_P$ is the focal length of $L_{P2}$. By satisfying this relationship, the projection lens can be telecentric on the short conjugate side and still have a short barrel length. Also, when the $L_{P2}$ component includes an aspheric surface, having $f_P/f_0 < 3.0$ tends to make the aspheric surface more effective in correcting the projection lens' aberrations.

The projection lenses of the invention preferably have a total of either four or five optical components, which greatly simplifies assembly and, by minimizing the number of surfaces from which light can reflect, reduces ghost formation.

The reference symbols used in the above summaries of the various aspects of the invention are only for the convenience of the reader and are not intended to and should not be interpreted as limiting the scope of the invention. More generally, it is to be understood that both the foregoing general description and the following detailed description are merely exemplary of the invention, and are intended to provide an overview or framework for understanding the nature and character of the invention.

Additional features and advantages of the invention are set forth in the detailed description which follows, and in part will be readily apparent to those skilled in the art from that description or recognized by practicing the invention as described herein. The accompanying drawings are included to provide a further understanding of the invention, and are incorporated in and constitute a part of this specification.

BRIEF DESCRIPTION OF THE DRAWINGS

FIGS. 1 through 5 are schematic side views of representative projection lenses constructed in accordance with the invention. In FIGS. 1-2 and 4-5, the layer (M) of a formable material is shown thicker than it actually is to make it easier to see in the drawings.

FIG. 6 is a schematic diagram showing an overall projection lens system in which the projection lenses of the present invention can be used.

DESCRIPTION OF THE PREFERRED EMBODIMENTS

As discussed above, in accordance with certain of its aspects, the present invention provides projection lenses for pixellated microdisplay projectors which employ a hybrid optical component, i.e., a component which is a combination of a glass lens element having spherical surfaces and a layer of a formable material whose external surface is aspheric. The use of such a component gives aspheric correction to the projection lens' second lens unit without adding to the projection lens' element count or its overall total path. Also, in high volume, one hybrid component of a resin asphere on glass can cost less than the combination of two lens elements, i.e., a spherical glass element plus a plastic asphere.

In effect, the hybrid allows the aspheric correction of a plastic element to be moved into intimate proximity with a glass element. In this way, the benefits of an aspheric surface correction are provided to a glass element without the loss of the fundamental properties of glass lenses, namely, ease of fabrication and lower thermal expansion and variation of refractive index over a broad operating range of temperatures.

Hybrid components (also referred to herein as "hybrid lenses") are formed by applying a layer of a formable material to a conventional spherical glass lens by means of either a cured, molded resin or a thin fabricated plastic. This asphere-to-sphere mating effectively allows one component to perform the function of what previously required two components. This gives several advantages including:

(1) One hybrid component can be thinner than two separate components.

(2) In fabrication, only one surface creation becomes critical, i.e., the aspheric side of the layer of formable material, since the other, mated surface takes on the properties of the spherical surface of the glass lens.

(3) The hybrid asphere portion of the lens has by itself no power, so the projection lens' susceptibility to thermal drift is minimized.

Examples of hybrid lenses can be found in U.S. Pat. Nos. 4,738,516 and 5,299,062, the contents of which are incorporated herein by reference. Such lenses are available commercially from Toyotec Co., Ltd. (Toyokawa-city, Aichi-Perf., Japan), as well as from Tamron and Canon in connection with camera taking lenses.

In general, these components can be made by placing a UV curable resin in a mold, and curing it onto the polished glass substrate (spherical lens) with UV light curing through the glass. The receiving mold has the aspheric profile of the finished hybrid surface. Material properties restrict the thickness of the resin layer and its center-to-edge variation. Too much resin material can cause the layer to pull off of the glass substrate either during curing or during use as a result of thermal cycling.

Several resins are available having indices of refraction ($n_d$) and dispersions ($v_d$ (F-C)) of approximately 1.5202 and 51.7, 1.518 and 37.6, and 1.519 and 53.7. A suitable resin employed in the projection lens of Example 1 has the following indices of refraction: 1.529705 at 460 nm; 1.521307 at 546 nm; and 1.515568 at 620 nm.

In general terms, a hybrid component made by molding a UV curable resin preferably satisfies the following criteria:

(1) The diameter of the substrate is preferably less than about 28 millimeters.

(2) The substrate glass preferably transmits UV light in sufficient amounts to allow curing of the resin in the mold by passing UV light through the lens. In particular, transmittance of 360 nm light is preferably more than 60%.

(3) The thinnest portion of the resin layer is preferably no less than 20 microns and the thickest portion is preferably no more than 400 microns.

(4) The variation in thickness from the center to the edge of the resin layer is preferably no more than 5:1, with thick edges preferably being avoided since they are more difficult to form than thin edges.

The projection lenses of the present invention have an overall form of a retrofocus or inverted telephoto lens with the first lens sub-unit ($U_{S1}$) of the first lens unit (U1) having a relatively strong negative power and the remainder of the lens ($U_{S2}$+U2) having a positive power. The lenses of the invention differ from many retrofocus lenses in that rather than having an aperture stop between the negative and positive parts of the lens, the aperture stop of the projection lenses of the invention is located between the first and second lens units (U1,U2) which typically will both have a positive power.

The use of this overall lens form to produce an image of a pixelized panel has various advantages. Thus, telecentricity can be achieved by locating the lens' aperture stop in the front focal plane of the second lens unit. Additional advantages, illustrated by the examples presented below, are the ability to achieve a relatively long effective back focal length and the ability to provide a wide field of view in the direction of the lens' long conjugate. As discussed above, both of these characteristics are particularly useful in rear projection systems, where the lens must have a wide field of view to achieve the smallest possible overall package size, and where there is a need to accommodate beam splitting prisms and/or beam guiding prisms between the lens and the pixelized panel. These prisms may include TIR prisms, polarizing beam splitters, and/or color splitting prisms.

The lenses of the invention achieve a high level of resolution by using one or more aspherical surfaces in the first lens sub-unit. Specifically, the $L_M$ lens element has one and preferably two aspherical surfaces. Preferably, $L_M$ has an overall meniscus shape which is convex towards the long conjugate side of the projection lens. The variation of thickness of the $L_M$ lens element is preferably minimized to reduce the molding time and thus the cost of that element. In particular, $L_M$ preferably has a center thickness $t_c$ and an edge thickness $t_e$ which satisfy the relationship:

$$t_e/t_c \leq 3.0,$$

where $t_e$ is determined at the clear aperture of the short conjugate surface of $L_M$ (i.e., surface 2 in Tables 1-5).

Spherical aberration of the lens' entrance pupil is corrected through the use of an aspherical surface in the second lens unit, e.g., the aspheric surface of a hybrid component (see Examples 1-2 and 4-5) or the aspheric surface of a molded glass element (see Example 3). The spherical aberration of the entrance pupil should be minimized to achieve telecentricity for any arbitrary point in the object plane of the lens.

As discussed above, the use of reflective pixelized panels can exacerbate the problem of ghost formation since such panels are designed to reflect light. In accordance with the invention, it has been found that as a result of their low component and low element counts, the projection lenses of the invention have extremely low ghost levels. These low ghost levels are in large part due to the reduced number of surfaces from which light can reflect. They are also due to the shapes of the surfaces which remain once the number of surfaces has been reduced.

In particular, as discussed in co-pending U.S. application Ser. No. 10/337,959, filed Jan. 7, 2003, and entitled "Folded, Telecentric Projection Lenses for Use with Pixelized Panels," the contents of which are incorporated herein by reference, low ghost levels can be achieved by ensuring that the axial marginal ray traced through a projection lens from the projection lens' short conjugate focal plane intersects each lens surface of the projection lens at an angle of incidence that is greater than 1.5 degrees. When the number of lens surfaces are reduced as in the projection lenses of the present invention, this criterion is generally automatically satisfied, which serves as an additional basis for the low ghost levels achieved by the lenses of the invention.

Without intending to limit it in any manner, the present invention will be more fully described by the following examples.

EXAMPLES

FIGS. 1-5 and Tables 1-5 illustrate representative projection lenses constructed in accordance with the invention.

Briefly, these examples illustrate the following:

Example 1—the use of a hybrid component ($L_{P2}$) in a projection lens having four optical components and designed for use with a reflective pixelized panel in which a prism is located between the projection lens and the panel.

Example 2—the use of a hybrid component ($L_{P2}$) in a projection lens having four optical components and designed for use with a transmissive pixelized panel in which a polarizer (e.g., analyzer) is located between the projection lens and the panel.

Example 3—the use of a glass asphere ($L_{P2}$) in a projection lens having four optical components and designed for use with a reflective pixelized panel in which a prism is located between the projection lens and the panel (note that at present, to produce a surface profile for a glass asphere which is sufficiently accurate to achieve high levels of aberration correction requires substantial care during manufacture and thus projection lenses employing hybrid components are currently the preferred embodiments of the invention).

Example 4—the use of a hybrid component ($L_{DB}$) in a projection lens having four optical components and designed for use with a reflective pixelized panel in which a prism is located between the projection lens and the panel (note that locating the layer of formable material on $L_{P2}$ generally results in higher levels of aberration correction than locating it on $L_{DB}$ and thus is preferred).

Example 5—the use of a hybrid component ($L_{P2}$) in a projection lens having five optical components and designed for use with a reflective pixelized panel in which (1) a prism is located between the projection lens and the panel and (2) the first lens sub-unit ($L_{S1}$) has two lens elements so as to improve the moldability of $L_M$.

OHARA designations are used in the prescriptions of Tables 1-5 for the various glasses employed in the lens systems. Equivalent glasses made by other manufacturers (e.g., HOYA or SCHOTT) can be used in the practice of the invention. Industry acceptable materials are used for the plastic elements. The index of refraction and dispersion of the layer of formable material used in the hybrid components is given in standard six digit form, i.e., abcxyz, where n≦1.abc and v=xy.z.

The aspheric coefficients set forth in the tables are for use in the following equation:

$$z = \frac{cy^2}{1+[1-(1+k)c^2y^2]^{1/2}} + Dy^4 + Ey^6 + Fy^8 + Gy^{10} + Hy^{12} + Iy^{14}$$

where z is the surface sag at a distance y from the optical axis of the system, c is the curvature of the lens at the optical axis, and k is a conic constant, which is zero except where indicated in the prescriptions of Tables 1-5.

The various planar structures located on the short conjugate side of U2 in the figures and tables represent components (e.g., prism PR and polarizer PO) which are used with or are a part of the pixelized panel. They do not constitute part of the projection lens. All dimensions given in Tables 1-5 are in millimeters except where other units are indicated.

The prescription tables are constructed on the assumption the light travels from left to right in the figures. In actual practice, the viewing screen will be on the left and the pixelized panel will be on the right, and light will travel from right to left. In particular, the references in the prescription tables to objects/images and entrance/exit pupils are reversed from that used in the rest of the specification. The pixelized panel is shown in the FIGS. 1-5 by the designation "PP" and the aperture stop is shown by the designation "AS".

The optical performance of the examples, specifically, blue/green lateral color, red/green lateral color, and RMS spot diameter for green light, are shown in Tables 1-5 in terms of the airy-disk diameter for a diffraction limited system. As known in the art (see, for example, Smith, Warren J., *Modern Optical Engineering: The Design of Optical Systems*, (2nd Edition), McGraw-Hill, New York, 1990, pages 151-154 and 452-453), the distance from the center of the airy disk to the first dark ring is given by:

$$z = 1.22 \cdot \lambda \cdot F/\#$$

where $\lambda$ is wavelength which for Tables 1-5 was chosen to be 0.55 microns (green light).

A representative pixel size is also shown in Tables 1-5. A comparison of this dimension with the optical performance of the lenses shows that for each example, the blue/green lateral color, the red/green lateral color, and the RMS spot diameter are all less than a pixel.

Table 6 sets forth the BFL/$f_0$ and BRL/$f_0$ values for Examples 1-5. As can be seen in this table, each of Examples 1-5 has a BFL/$f_0$ value above 1.5 and a BRL/$f_0$ value less than 10. As can be seen from Tables 1-5, all of the examples also have a full field of view in the direction of the lens' long conjugate which is greater than 70° and an entrance pupil (exit pupil in Tables 1-5) which is telecentric.

In summary, as discussed and illustrated above, the invention provides projection lenses for use with pixelized panels which have some and preferably all of the following features:

(1) a high level of lateral color correction;
(2) a high level of resolution;
(3) a large field of view in the direction of the image;
(4) a telecentric entrance pupil;
(5) a relatively long effective back focal length;
(6) a short barrel length;
(7) a low optical component count, e.g., 4 or 5 components;
(8) a low element count, e.g., 5 or 6 elements;
(9) a low level of ghost generation; and/or
(10) a low level of thermal drift.

The projection lenses are well-suited to the manufacture of compact, light weight, projection televisions and monitors which employs pixelized panels.

Although specific embodiments of the invention have been described and illustrated, it is to be understood that a variety of modifications which do not depart from the scope and spirit of the invention will be evident to persons of ordinary skill in the art from the foregoing disclosure.

TABLE 1

| Surf | Radius | Thickness | Glass | Diameter | Type |
|---|---|---|---|---|---|
| OBJ | Infinity | 733.00 | | | |
| 1 | 175.000 | 4.50 | Acrylic | 60.00 | plastic asphere |
| 2 | 16.411 | 43.29 | | 43.00 | plastic asphere |
| 3 | 42.380 | 5.00 | S-TIH6 | 28.00 | |
| 4 | Infinity | 20.27 | | 30.00 | |
| Stop | Infinity | 4.09 | | 10.31 | |
| 6 | −16.225 | 3.50 | S-TIH10 | 11.60 | |
| 7 | 18.964 | 6.50 | S-BSM25 | 18.80 | |
| 8 | −18.964 | 8.83 | | 17.00 | |
| 9 | 40.115 | 0.07 | 521369 | 25.50 | aspheric resin |
| 10 | 40.115 | 10.50 | S-LAL14 | 26.00 | |
| 11 | 40.115 | 3.33 | | 29.00 | |
| 12 | Infinity | 26.00 | BK7 | 27.00 | |
| 13 | Infinity | 3.00 | | 27.00 | |
| 14 | Infinity | 3.00 | S-FSL5 | 22.00 | |
| 15 | Infinity | 0.44 | | 22.00 | |
| Image | | | | | |

Even Polynomial Aspheres

| Surf | k | D | E | F | G |
|---|---|---|---|---|---|
| 1 | −1257.53 | 1.35079E−06 | −1.95684E−09 | 9.06899E−13 | |
| 2 | −2.92 | 3.96302E−05 | −6.10837E−08 | 5.83808E−11 | −2.23766E−14 |
| 9 | 2.83 | −1.82745E−05 | 1.11478E−08 | −9.57933E−11 | 11.50867E−13 |

First Order Properties of Elements:

| Element # | Surface #'s | EFL |
|---|---|---|
| 1 | 1-2 | −36.55 |
| 2 | 3-4 | 50.64 |
| 3 | 6-7 | −19.00 |
| 4 | 7-8 | 31.60 |
| 5 | 9-11 | 29.90 |

TABLE 1-continued

Doublet Properties

| Element #'s | Surface #'s | EFL |
|---|---|---|
| 3 4 | 6-8 | −181.30 |

Unit EFL Properties

| Element #'s | Surface #'s | EFL |
|---|---|---|
| 1-2 | 1-4 | 64.07 |
| 3-5 | 6-11 | 25.24 |

First Order Data:

| | |
|---|---|
| F/Number (F/#) | 2.4 |
| Magnification | 56.53 |
| Object Height | 576.0 |
| Object Distance | 733.0 |
| Image Height | 10.2 |
| Effective Focal Length | 13.48 |
| Barrel Length (BRL) | 106.0 |
| Front Vertex Distance (FVD) | 142.3 |
| Entrance Pupil Distance | 29.1 |
| Exit Pupil Distance | −204.1 |
| Stop Diameter | 10.3 |
| Field Angle (semi-diag; degrees) | 37.0 |
| Back Focal Length (BFL) | 25.7 |
| $t/t_c$ for $L_M$ | 3.8 |

Performance

| | microns | Relative to F/# |
|---|---|---|
| Diffraction limit airy disk (DL) | 3.2 | 1.3 |
| Pixel relative to DL | 13.7 | 5.7 |
| Lateral Color (R-G)[1] | 7.2 | 3.0 |
| Lateral Color (B-G)[2] | 8.8 | 3.7 |
| RMS spot diameter (G)[3] | 6.5 | 2.7 |

[1] For all edge points, 620-550 nM
[2] For all edge points, 460-550 nM
[3] Less than for all field points

TABLE 2

| Surf | Radius | Thickness | Glass | Diameter | Type |
|---|---|---|---|---|---|
| OBJ | Infinity | 796.664 | | 1270.0 | |
| 1 | 248.713 | 4.500 | Acrylic | 60.0 | plastic asphere |
| 2 | 18.230 | 55.272 | | 44.0 | plastic asphere |
| 3 | 41.495 | 5.000 | S-TIH4 | 24.8 | |
| 4 | −1507.600 | 16.053 | | 25.0 | |
| Stop | Infinity | 7.757 | | 11.8 | |
| 6 | −15.777 | 1.800 | S-TIH6 | 13.7 | |
| 7 | 31.101 | 8.500 | S-BSM25 | 18.0 | |
| 8 | −19.166 | 2.711 | | 20.3 | |
| 9 | 40.115 | 0.070 | 518375 | 25.0 | aspheric resin |
| 10 | 40.115 | 10.500 | S-LAL14 | 26.0 | |
| 11 | 40.115 | 25.212 | | 28.0 | |
| 12 | Infinity | 0.750 | BK7 | 28.0 | |
| 13 | Infinity | 2.900 | BK7 | 26.0 | |
| 14 | Infinity | 1.000 | | 26.0 | |
| Image | | | | | |

Even Polynomial Aspheres

| Surf | k | D | E | F | G | H | I |
|---|---|---|---|---|---|---|---|
| 1 | −1257.525 | 4.25749E−06 | −5.49870E−09 | 3.77213E−12 | −7.57586E−16 | −4.88590E−19 | 2.45339E−22 |
| 2 | −2.915 | 3.85561E−05 | −4.91525E−08 | 5.43639E−11 | −9.60685E−16 | −1.07329E−16 | 1.28864E−19 |
| 9 | 25.500 | −1.83E−05 | 1.11E−08 | −9.58E−11 | 1.51E−13 | | |

TABLE 2-continued

First Order Properties of Elements:

| Element # | Surface #'s | EFL |
|---|---|---|
| 1 | 1-2 | −40.8 |
| 2 | 3-4 | 53.09 |
| 3 | 6-7 | −17.60 |
| 4 | 7-8 | 32.77 |
| 5 | 9-11 | 30.31 |

Doublet Properties

| Element #'s | Surface #'s | EFL |
|---|---|---|
| 3 4 | 6-8 | −96.7 |

Unit EFL Properties

| Element #'s | Surface #'s | EFL |
|---|---|---|
| 1-2 | 1-4 | 50.6 |
| 3-5 | 6-11 | 27.9 |

First Order Data:

| | |
|---|---|
| F/Number (F/#) | 2.4 |
| Magnification | 56.53 |
| Object Height | 576.0 |
| Object Distance | 796.7 |
| Image Height | 10.20 |
| Effective Focal Length (EFL) | 13.34 |
| Barrel Length (BRL) | 101.6 |
| Front Vertex Distance (FVD) | 140.3 |
| Entrance Pupil Distance | 30.4 |
| Exit Pupil Distance | −172.0 |
| Stop Diameter | 11.17 |
| Field Angle (semi-diag) | 37.00 |
| Back Focal Length (BFL) | 28.60 |
| $t_s/t_a$ for $L_M$ | 4.07 |

Performance

| | microns | Relative to F/# |
|---|---|---|
| Diffraction limit airy disk (DL) | 3.20 | 1.3 |
| Pixel relative to DL | 13.70 | 5.7 |
| Lateral Color (R-G)[1] | 10.50 | 4.4 |
| Lateral Color (B-G)[2] | 10.90 | 4.5 |
| RMS spot diameter (G)[3] | 9.00 | 3.8 |

[1] For all edge points, 620-550 nM
[2] For all edge points, 460-550 nM
[3] Less than for all field points

TABLE 3

| Surf | Radius | Thickness | Glass | Diameter | Type |
|---|---|---|---|---|---|
| OBJ | Infinity | 733.000 | | 1148.2 | |
| 1 | 175.000 | 4.500 | Acrylic | 60.0 | plastic asphere |
| 2 | 16.411 | 43.293 | | 40.0 | plastic asphere |
| 3 | 42.380 | 5.000 | S-TIH6 | 28.0 | |
| 4 | Infinity | 20.274 | | 30.0 | |
| Stop | Infinity | 4.094 | | 10.2 | |
| 6 | −16.225 | 3.500 | S-TIH10 | 11.6 | |
| 7 | 18.964 | 6.500 | S-BSM25 | 18.8 | |
| 8 | −18.964 | 8.416 | | 17.0 | |
| 9 | 39.626 | 10.000 | S-LAL12 | 28.0 | glass asphere |
| 10 | −39.016 | 5.288 | | 28.0 | |
| 11 | Infinity | 26.000 | BK7 | 27.0 | |
| 12 | Infinity | 2.000 | | 27.0 | |
| 13 | Infinity | 2.400 | BK7 | 21.8 | |
| 14 | Infinity | 0.188 | | 21.5 | |
| Image | Infinity | | | 20.4 | |

TABLE 3-continued

Even Polynomial Aspheres

| Surf | k | D | E | F | G |
|---|---|---|---|---|---|
| 1 | −1257.525 | 1.350794E−06 | −1.956845E−09 | 9.068988E−13 | |
| 2 | −2.915 | 3.963025E−05 | −6.108372E−08 | 5.838076E−11 | −2.237662E−14 |
| 9 | 3.508 | −1.700834E−05 | 9.233635E−10 | −6.705536E−11 | |

First Order Properties of Elements:

| Element # | Surface #'s | EFL |
|---|---|---|
| 1 | 1-2 | −36.55 |
| 2 | 3-4 | 50.64 |
| 3 | 6-7 | −19.00 |
| 4 | 7-8 | 31.60 |
| 5 | 9-11 | 30.06 |

Doublet Properties

| Element #'s | Surface #'s | EFL |
|---|---|---|
| 3 4 | 6-8 | −181.30 |

Unit EFL Properties

| Element #'s | Surface #'s | EFL |
|---|---|---|
| 1-2 | 1-4 | 64.07 |
| 3-5 | 6-11 | 25.24 |

First Order Data:

| | |
|---|---|
| F/Number (F/#) | 2.4 |
| Magnification | 56.53 |
| Object Height | 576.0 |
| Object Distance | 733.0 |
| Image Height | 10.2 |
| Effective Focal Length | 13.48 |
| Barrel Length (BRL) | 106.0 |
| Front Vertex Distance (FVD) | 142.3 |
| Entrance Pupil Distance | 29.1 |
| Exit Pupil Distance | −204.1 |
| Stop Diameter | 10.3 |
| Field Angle (semi-diag) | 37.0 |
| Back Focal Length (BFL) | 25.7 |
| $t_s/t_w$ for $L_M$ | 3.80 |

Performance

| | microns | Relative to F/# |
|---|---|---|
| Diffraction limit airy disk (DL) | 3.2 | 1.3 |
| Pixel relative to DL | 13.7 | 5.7 |
| Lateral Color (R-G)[1] | 8.1 | 3.4 |
| Lateral Color (B-G)[2] | 8.4 | 3.5 |
| RMS spot diameter (G)[3] | 7.0 | 2.9 |

[1] For all edge points, 620-550 nM
[2] For all edge points, 460-550 nM
[3] Less than for all field points

TABLE 4

| Surf | Radius | Thickness | Glass | Diameter | Type |
|---|---|---|---|---|---|
| OBJ | Infinity | 733.000 | | 1148.2 | |
| 1 | 175.000 | 4.500 | Acrylic | 60.0 | plastic asphere |
| 2 | 16.411 | 43.293 | | 40.0 | plastic asphere |
| 3 | 42.380 | 5.000 | S-TIH6 | 28.0 | |
| 4 | Infinity | 20.274 | | 30.0 | |
| Stop | Infinity | 4.094 | | 10.2 | |
| 6 | −16.225 | 3.500 | S-TIH10 | 11.6 | |
| 7 | 18.964 | 6.500 | S-BSM25 | 18.8 | |
| 8 | −18.964 | 8.416 | | 17.0 | |
| 9 | 39.626 | 10.000 | S-LAL12 | 28.0 | glass asphere |
| 10 | −39.016 | 5.288 | | 28.0 | |

TABLE 4-continued

| | | | | |
|---|---|---|---|---|
| 11 | Infinity | 26.000 | BK7 | 27.0 |
| 12 | Infinity | 2.000 | | 27.0 |
| 13 | Infinity | 2.400 | BK7 | 21.8 |
| 14 | Infinity | 0.188 | | 21.5 |
| Image | Infinity | | | 20.4 |

Even Polynomial Aspheres

| Surf | k | D | E | F | G | H |
|---|---|---|---|---|---|---|
| 1 | −4,164.177 | | | | | |
| 2 | −2.582 | 6.10971E−05 | −1.33460E−07 | 2.41530E−10 | −1.94589E−13 | |
| 9 | 2.149 | 3.05382E−05 | 6.48692E−08 | 8.50069E−11 | −8.62105E−13 | 3.47336E−15 |

First Order Properties of Elements:

| Element # | Surface #'s | EFL |
|---|---|---|
| 1 | 1-2 | −30.43 |
| 2 | 3-4 | 61.77 |
| 3 | 6-7 | 48.41 |
| 4 | 7-8 | 89.40 |
| 5 | 10-11 | 30.24 |

Doublet Properties

| Element # | Surface #'s | EFL |
|---|---|---|
| 3 4 | 6-8 | −318.9 |

Unit EFL Properties

| Element #'s | Surface #'s | EFL |
|---|---|---|
| 1-2 | 1-4 | 831.0 |
| 3-5 | 6-11 | 27.9 |

First Order Data:

| | |
|---|---|
| F/Number | 2.4 |
| Magnification | 56.33 |
| Object Height | 576.0 |
| Object Distance | 796.7 |
| Image Height | 10.20 |
| Effective Focal Length (EFL) | 13.34 |
| Barrel Length (BRL) | 105.6 |
| Front Vertex Distance (FVD) | 147.3 |
| Entrance Pupil Distance | 30.4 |
| Exit Pupil Distance | −172.0 |
| Stop Diameter | 11.17 |
| Field Angle (semi-diag) | 37.0 |
| Back Focal Length (BFL) | 31.7 |
| $t_i/t_a$ for $L_{74}$ | 3.9 |

Performance

| | microns | Relative to F/# |
|---|---|---|
| Diffraction limit airy disk (DL) | 3.20 | 1.3 |
| Pixel relative to DL | 13.70 | 5.7 |
| Lateral Color (R-G)[1] | 9.70 | 4.0 |
| Lateral Color (B-G)[2] | 6.20 | 2.6 |
| RMS spot diameter (G)[3] | 9.80 | 4.1 |

[1]For all edge points, 620-550 nM
[2]For all edge points, 460-550 nM
[3]Less than for all field points

TABLE 5

| Surf | Radius | Thickness | Glass | Diameter | Type |
|---|---|---|---|---|---|
| OBJ | Infinity | 867.1 | | 1148.2 | |
| 1 | 186.359 | 4.800 | Acrylic | 46.0 | plastic asphere |
| 2 | 17.426 | 20.123 | | 34.0 | plastic asphere |
| 3 | −16.461 | 3.000 | BK7 | 24.0 | |
| 4 | −19.715 | 27.951 | | 27.0 | |

TABLE 5-continued

| Surf | Radius | Thickness | Glass | Aperture Diameter | Notes |
|---|---|---|---|---|---|
| Stop | 32.341 | 7.500 | S-TIH6 | 15.6 | |
| 6 | −219.816 | 0.800 | | 20.0 | |
| 7 | Infinity | 10.291 | | 13.6 | |
| 8 | −23.280 | 2.750 | S-TIH53 | 16.0 | |
| 9 | 24.713 | 9.000 | S-PHM53 | 16.0 | |
| 10 | −24.713 | 6.909 | | 21.0 | |
| 11 | 44.314 | 0.070 | 518376 | 26.0 | aspheric resin |
| 12 | 44.314 | 6.000 | S-LAL14 | 26.0 | |
| 13 | −44.314 | 5.417 | | 29.0 | |
| 14 | Infinity | 26.000 | BK7 | 30.0 | |
| 15 | Infinity | 3.000 | | 30.00 | |
| 16 | Infinity | 3.000 | S-FSL5 | 24.0 | |
| 17 | Infinity | 0.440 | | 24.0 | |
| Image | | | | | |

Even Polynomial Aspheres

| Surf | k | D | E | F | G | H |
|---|---|---|---|---|---|---|
| 1 | | 1.180700E−05 | −3.117928E−08 | 5.420886E−11 | −4.086549E−14 | 8.670902E−19 |
| 2 | −0.68818 | 1.087223E−05 | −2.704129E−08 | −2.194379E−10 | 1.439643E−12 | −4.743224E−15 |
| 11 | 8.10382 | −2.646302E−05 | 7.474352E−08 | −1.381647E−09 | 8.442319E−12 | −2.525340E−14 |

First Order Properties of Elements:

| Element # | Surface #'s | EFL |
|---|---|---|
| 1 | 1-2 | −39.31 |
| 2 | 3-4 | −280.66 |
| 3 | 5-6 | 35.22 |
| 4 | 8-9 | −21.20 |
| 5 | 9-10 | 62.94 |
| 6 | 11-13 | 32.55 |

Doublet Properties

| Element # | Surface #'s | EFL |
|---|---|---|
| 4 5 | 8-10 | −67.37 |

Unit EFL Properties

| Element #'s | Surface #'s | EFL |
|---|---|---|
| 1-3 | 1-6 | 24.31 |
| 4-6 | 8-13 | 33.71 |

First Order Data:

| | |
|---|---|
| F/Number | 2.4 |
| Magnification | 56.30 |
| Object Height | 576.0 |
| Object Distance | 733.0 |
| Image Height | 10.2 |
| Effective Focal Length (EFL) | 13.90 |
| Barrel Length (BRL) | 99.1 |
| Front Vertex Distance (FVD) | 137.1 |
| Entrance Pupil Distance | 25.3 |
| Exit Pupil Distance | 175.6 |
| Stop Diameter | 13.7 |
| Field Angle (semi-diag) | 36.9 |
| Back Focal Length (BFL) | 28.1 |
| $t_e/t_c$ for $L_M$ | 2.3 |

Performance

| | microns | Relative to F/# |
|---|---|---|
| Diffraction limit airy disk (DL) | 3.20 | 1.3 |
| Pixel relative to DL | 13.5 | 5.6 |
| Lateral Color (R-G)[1] | 5.8 | 2.4 |
| Lateral Color (B-G)[2] | 10.8 | 4.5 |
| RMS spot diameter (G)[3] | 8.8 | 3.7 |

[1] For all edge points, 620-550 nM
[2] For all edge points, 460-550 nM
[3] Less than for all field points

TABLE 6

| Example | BFL/$f_o$ | BRL/$f_o$ |
| --- | --- | --- |
| 1 | 1.9 | 7.9 |
| 2 | 2.1 | 7.6 |
| 3 | 1.9 | 7.9 |
| 4 | 2.4 | 7.9 |
| 5 | 2.0 | 7.1 |

What is claimed is:

1. A projection lens for forming an enlarged image of a pixelized panel on a screen, said projection lens having a long conjugate side, a short conjugate side, an effective focal length $f_o$, and an f-number F/#, said lens comprising an order from the long conjugate side to the short conjugate side:

(A) a first lens unit consisting in order from the long conjugate side to the short conjugate side of:
  (i) a first lens sub-unit having a negative power and comprising a negative lens element $L_M$ which (a) has a short conjugate surface which is concave towards the short conjugate side and (b) comprises at least one aspheric surface; and
  (ii) a second lens sub-unit;

(B) an aperture stop; and (C) a second lens unit comprising in order from the long conjugate side to the short conjugate side:
  (i) a doublet; and
  (ii) a positive lens element;

wherein:

(a) the first and second lens units are the only lens units of the projection lens;

(b) the projection lens is telecentric on the short conjugate side;

(c) the projection lens has a lateral color LC in its short conjugate focal plane which in micrometers satisfies the relationships:

$$LC_{red-green} < 4.5*F/\#, \text{ and}$$

$$LC_{blue-green} < 5.0*F/\#,$$

where the relationships are satisfied over the full field and the red, green, and blue wavelengths are 0.62 micrometers, 0.55 micrometers, and 0.46 micrometers, respectively;

(d) the projection lens has an RMS spot diameter $D_{rms}$ in its short conjugate focal plane which in micrometers satisfies the relationship:

$$D_{rms} < 4.5*F/\#,$$

where the relationship is satisfied over the full field for green light having a wavelength of 0.55 micrometers; and (e) the second lens unit comprises a layer of a formable material attached to the doublet or to the positive lens element, said layer having an external surface which is aspheric.

2. The projection lens of claim 1 where $L_M$ is the only optical component of the first lens sub-unit.

3. The projection lens of claim 1 where $L_M$ and a negative lens element are the only optical components of the first lens sub-unit.

4. The projection lens of claim 3 where $L_M$ has a center thickness $t_c$ and an edge thickness $t_e$ which satisfy the relationship:

$$t_e/t_c \leq 3.0,$$

where $t_e$ is determined at the clear aperture of the short conjugate surface of $L_M$.

5. The projection lens of claim 1 where $L_M$ has an overall meniscus shape.

6. The projection lens of claim 1 where the second lens sub-unit has only one optical component.

7. The projection lens of claim 6 where the one optical component is a positive lens element.

8. The projection lens of claim 1 where the doublet and the positive lens element are the only optical components of the second lens unit.

9. The projection lens of claim 1 where the layer of a formable material is attached to the positive lens element.

10. The projection lens of claim 9 where the positive lens element has a focal length $f_P$ which satisfies the relationship:

$$f_P/f_o < 3.0.$$

11. The projection lens of claim 1 where $LC_{red-green}$ and $LC_{blue-green}$ satisfy the relationships:

$$LC_{red-green} < 3.5*F/\#, \text{ and}$$

$$LC_{blue-green} < 4.0*F/\#.$$

12. The projection lens of claim 1 where $D_{rms}$ satisfies the relationship:

$$D_{rms} < 3.5*F/\#.$$

13. The projection lens of claim 1 where the lens has a full field of view in the direction of the long conjugate which is greater than 70 degrees.

14. The projection lens of claim 1 where the lens has an effective back focal length BFL which satisfies the relationship:

$$BFL/f_o > 1.5.$$

15. The projection lens of claim 1 where the lens has a barrel length BRL which satisfies the relationship:

$$BRL/f_o < 10.$$

16. The projection lens of claim 1 where the first and second lens units together have a total of five optical components.

17. The projection lens of claim 1 where the first and second lens units together have a total of four optical components.

18. A projection lens system comprising:
  (a) a pixelized panel; and
  (b) the projection lens of claim 1.

19. The projection lens system of claim 18 further comprising an illumination system which comprises a light source and illumination optics which transfers some of the light from the light source towards the pixelized panel and the projection lens.

20. A projection lens for forming an enlarged image of a pixelized panel on a screen, said projection lens having a long conjugate side, a short conjugate side, an effective focal length $f_0$, and an f-number F/#, said lens comprising in order from the long conjugate side to the short conjugate side:
  (A) a first lens unit consisting in order from the long conjugate side to the short conjugate side of:
    (i) a first lens sub-unit having a negative power and consisting of:
      a first negative lens element of overall meniscus shape which is convex towards the long conjugate side and comprises at least one aspheric surface, and
      optionally, a second negative lens element; and
    (ii) a second lens sub-unit which consists of a first positive lens element;
  (B) an aperture stop; and
  (C) a second lens unit consisting in order from the long conjugate side to the short conjugate side of:
    (i) a doublet; and
    (ii) a second positive lens element;
  wherein:
  (a) the first and second lens units are the only lens units of the projection lens;
  (b) the projection lens is telecentric on the short conjugate side;
  (c) the projection lens has a lateral color LC in its short conjugate focal plane which in micrometers satisfies the relationships:

$$LC_{red-green} < 3.5 * F/\#, \text{ and}$$
  $$LC_{blue-green} < 4.0 * F/\#,$$

where the relationships are satisfied over the full field and the red, green, and blue wavelengths are 0.62 micrometers, 0.55 micrometers, and 0.46 micrometers, respectively;
  (d) the projection lens has an RMS spot diameter $D_{rms}$ in its short conjugate focal plane which in micrometers satisfies the following relationship:

$$D_{rms} < 3.5 * F/\#,$$

where the relationship is satisfied over the full field for green light having a wavelength of 0.55 micrometers;
  (e) the projection lens has a full field of view in the direction of the long conjugate which is greater than 70 degrees;
  (f) the projection lens has an effective back focal length BFL which satisfies the relationship:

$$BFL/f_0 > 1.5;$$

(g) the projection lens has a barrel length BRL which satisfies the relationship:

$$BRL/f_0 < 10; \text{ and}$$

(h) the second lens unit comprises a layer of a formable material attached to the second positive lens element, said layer having an external surface which is aspheric.

21. The projection lens of claim 20 where the second positive lens element has a focal length $f_p$ which satisfies the relationship:

$$f_p/f_0 < 3.0.$$

22. A projection lens system comprising:
  (a) a pixelized panel; and
  (b) the projection lens of claim 20.

23. A projection lens for forming an enlarged image of a pixelized panel on a screen, said projection lens having a long conjugate side, a short conjugate side, an effective focal length $f_0$, and an f-number F/#, said lens comprising in order from the long conjugate side to the short conjugate side:
  (A) a first lens unit consisting in order from the long conjugate side to the short conjugate side of:
    (i) a first lens sub-unit having a negative power and consisting of:
      a first negative lens element which (a) has a short conjugate surface which is concave towards the short conjugate side and (b) comprises at least one aspheric surface, and
      optionally, a second negative lens element; and
    (ii) a second lens sub-unit which consists of a first positive lens element;
  (B) an aperture stop; and
  (C) a second lens unit consisting in order from the long conjugate side to the short conjugate side of:
    (i) a doublet; and
    (ii) a second positive lens element;
  wherein:
  (a) the first and second lens units are the only lens units of the projection lens;
  (b) the projection lens is telecentric on the short conjugate side;
  (c) the projection lens has a lateral color LC in its short conjugate focal plane which in micrometers satisfies the relationships:

$$LC_{red-green} < 4.5 * F/\#, \text{ and}$$
  $$LC_{blue-green} < 5.0 * F/\#,$$

where the relationships are satisfied over the full field and the red, green, and blue wavelengths are 0.62 micrometers, 0.55 micrometers, and 0.46 micrometers, respectively;
  (d) the projection lens has an RMS spot diameter $D_{rms}$ in its short conjugate focal plane which in micrometers satisfies the following relationship:

$$D_{rms} < 4.5 * F/\#,$$

where the relationship is satisfied over the full field for green light having a wavelength of 0.55 micrometers;
  (e) the projection lens has a full field of view in the direction of the long conjugate which is greater than 70 degrees;

(f) the projection lens has an effective back focal length BFL which satisfies the relationship:

$BFL/f_0 > 1.5;$ (g) the projection lens has a barrel length BRL which satisfies the relationship:

$BRL/f_0 < 10;$ and (h) the second positive lens element is composed at least in part of glass and comprises an aspheric surface.

24. The projection lens of claim 23 where the second positive lens element has a focal length $f_p$ which satisfies the relationship:

$f_p/f_0 < 3.0.$

25. A projection lens system comprising:
(a) a pixelized panel; and
(b) the projection lens of claim 23.

* * * * *